United States Patent
Yumoto et al.

(10) Patent No.: US 6,800,220 B2
(45) Date of Patent: Oct. 5, 2004

(54) OPTICALLY ACTIVE POLYESTER, PHOTOREACTIVE CHIRAL AGENT, LIQUID CRYSTAL COMPOSITION, LIQUID CRYSTAL COLOR FILTER, OPTICAL FILM, RECORDING MEDIUM, METHOD OF CHANGING THE HELICAL STRUCTURE OF A LIQUID CRYSTAL, AND METHOD OF FIXING THE HELICAL STRUCTURE OF A LIQUID CRYSTAL

(75) Inventors: Masatoshi Yumoto, Shizuoka-ken (JP); Mitsuyoshi Ichihashi, Kanagawa (JP); Kouya Kawabata, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 50 days.

(21) Appl. No.: 10/143,876

(22) Filed: May 14, 2002

(65) Prior Publication Data
US 2003/0111639 A1 Jun. 19, 2003

(30) Foreign Application Priority Data
May 15, 2001 (JP) ......................................... 2001-144532

(51) Int. Cl.[7] ......................... C09K 19/38; C09K 19/34; C09K 19/32; C09K 19/58; C08G 63/52; G02B 5/20; G02B 5/26

(52) U.S. Cl. ............................. 252/299.01; 252/299.5; 252/299.61; 252/299.62; 252/299.67; 252/299.7; 528/403; 528/406; 528/190; 528/192; 528/193; 528/194; 430/20; 430/270.11; 430/627; 349/2; 349/106; 428/1.33

(58) Field of Search ....................... 252/299.01, 299.61, 252/299.62, 299.67, 299.5; 428/1.33, 1.1; 528/403, 406; 349/2, 106; 430/20, 627, 270.11, 630

(56) References Cited

U.S. PATENT DOCUMENTS 5,668,614 A    9/1997    Chien et al.

6,589,445 B2 *    7/2003    Sugiyama et al.   ..... 252/299.01

FOREIGN PATENT DOCUMENTS

| JP | 9-506088 | 6/1997 |
|----|----------|--------|
| JP | 11-500160 | 1/1999 |
| WO | WO 95/16007 | 6/1995 |
| WO | WO 96/25449 | 8/1996 |
| WO | WO 98/34974 | 8/1998 |
| WO | WO 00/34808 | 6/2000 |

* cited by examiner

Primary Examiner—Shean C. Wu
(74) Attorney, Agent, or Firm—Sughrue Mion, PLLC

(57) ABSTRACT

The present invention discloses an optically active polyester comprising at least constituent units represented by the general formula (I) and the general formula (II):

General Formula (I)

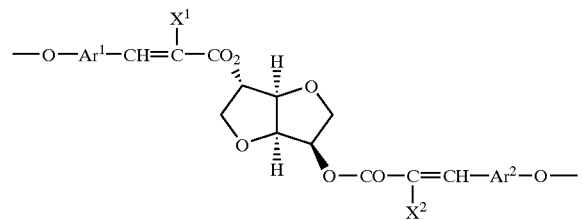

wherein $Ar^1$ and $Ar^2$ each independently represents a bivalent aromatic group or a bivalent heteroaromatic group, and $X^1$ and $X^2$ each independently represents a hydrogen atom or an electron-withdrawing group, General Formula (II)

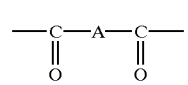

wherein A represents a bivalent substituent.

19 Claims, 3 Drawing Sheets

OPTICALLY ACTIVE POLYESTER, PHOTOREACTIVE CHIRAL AGENT, LIQUID CRYSTAL COMPOSITION, LIQUID CRYSTAL COLOR FILTER, OPTICAL FILM, RECORDING MEDIUM, METHOD OF CHANGING THE HELICAL STRUCTURE OF A LIQUID CRYSTAL, AND METHOD OF FIXING THE HELICAL STRUCTURE OF A LIQUID CRYSTAL

BACKGROUND OF THE INVENTION

1. Field of the Invention

The present invention relates to an optically active polyester having photosensitivity; a photoreactive chiral agent which causes a change in liquid crystal structure; a liquid crystal composition, an optical film, a liquid crystal color filter and a recording medium containing this agent; and a method of changing or fixing the helical structure of a liquid crystal.

2. Description of the Related Art

In recent years, attention has been paid to liquid crystal materials. For example, a cholesteric liquid crystal compound, which has a helical structure and exhibits various selective reflected colors by the pitch of the helix, and the like compounds are superior in selective reflectivity and color purity in the range of the visible region. Therefore, these compounds are widely used as an optical film, a liquid crystal color filter, a recording medium and so on.

As a specific example thereof, a color filter will be described hereinafter.

For example, a color filter used in a color liquid crystal display or the like is generally composed of pixels in red (R), green (G) and blue (B), and a black matrix for improving display contrast, which is formed between the pixels. Conventionally, the main current of such a color filter is a filter comprising a pigment dispersed in a resin or a dyed colorant. The method of producing the color filter is in general a method of applying a color-resin solution to a glass substrate by spin coating or the like to form a colored resist layer, and patterning the layer by photolithography to form color filter pixels, or a method of printing colored pixels directly onto a substrate.

However, for example, the production method based on printing has drawbacks that color filters obtained by this method has a low resolution of pixels and does not cope easily with the formation of an highly-minute image pattern. The production method based on spin-coating has drawbacks that a loss of raw material is large and unevenness of coating is large in the case that this method is applied to a substrate having a large area. According to a production method based electrodeposition, it is possible to obtain a color filter having a relatively high resolution and a little unevenness of a colored layer. However, this method has drawbacks that producing steps therein are complicated and control of the solution is also difficult.

For the above-mentioned reasons, it has been demanded to develop, as a method of producing a color filter, a method which causes little loss in raw materials and which makes it possible to produce a color filter with high efficiency and ease.

As the performance of a color filter, high transmittance and high color purity are demanded. In recent years, the demands have been satisfied by optimizing, in the method using a colorant, the kind of the colorant or a resin to be dyed, or by making, in the method using a pigment, the pigment into particles dispersed into very fine particles. However, in recent liquid crystal display (LCD) panels, the transmittance and color purity of their color filter have been requested to be very high. Particularly in a reflection type color filter for LCD, it is difficult to satisfy all of white display corresponding to white paper, contrast, and color reproducibility. All color filters produced by dying a colorant in a resin or dispersing a pigment therein in the conventional production methods are light-absorbing type color filters; therefore, an improvement in color purity based on a more improvement in the transmittance thereof substantially reaches the upper limit.

In light of situation as described above, a color filter using polarized light, which is made mainly of cholesteric liquid crystal, is known. In the color filter using polarized light, light rays of a given quantity are reflected and light rays of a quantity other than the given quantity are transmitted to display images. Therefore, the color filter has a high efficiency of using light and is superior in transmittance and color purity to the light-absorbing type color filter. The production method thereof is in general a method of forming a film on a substrate by spin coating or the like in order to make the thickness of the film uniform. However, this method has a problem that a loss in raw materials is large and is disadvantageous from the viewpoint of costs.

As a method for solving the above-mentioned problems and making it possible to ensure the uniformity of the color purity or the like of a color filter film and realize a reduction in the number of the producing steps thereof, a method of using a photoreactive chiral compound is useful. This method is a principle as follows: when a liquid crystal composition containing a photoreactive chiral compound is irradiated patternwise with light having a reaction wavelength of the chiral compound, reaction of the chiral compound advances correspondingly to the intensity of irradiation energy so that the helical pitch (twisting angle) of the liquid crystal compound changes; therefore, selective reflected colors are formed in respective pixels only by pattern-exposure having a distribution in light energy. Thus, this method has an advantage that patterning at the time of forming a color filter is finished by carrying out mask-exposure using a mask having a distribution in transmitted light quantity only one time.

Accordingly, a film functioning as a color filter can be formed by irradiating a cholesteric liquid crystal compound imagewise with light to pattern the compound and then fixing the compound. This can be applied to an optical film, image-recording, and so on.

Particularly in the case that a color filter is produced by subjecting a liquid crystal to mask-exposure one time, it is desired that three primary colors of blue (B), green (G) and red (R) can be produced with high color purity by the one-time exposure. However, when a rate of change in the twist of the liquid crystal is small, sufficient color purity cannot be obtained. Therefore, in order to display the three primary colors having high color purity by one-time exposure, it is necessary to use, as a photoreactive chiral compound, a chiral compound (chiral agent) having a high rate of change in twisting so as to change the twisting power of its helical structure largely. That is, by using a chiral compound having a high rate of change in twisting, the light quantity thereof is changed, whereby the range of selective reflected colors can be enlarged.

As such a chiral agent, the Applicant filed a Japanese Patent Application about a low molecular-weight photoreactive chiral agent having an isosorbide skeleton (Japanese Patent Application No. 2001-5740). Moreover, WO 00/34808 discloses a low molecular-weight photoreactive chiral agent having a benzylidene menthone skeleton.

In the case that a cholesteric liquid crystal compound is irradiated imagewise with light to pattern the compound and then the patterned compound is fixed, an image having a high resolution cannot be obtained, an image is not maintained during the time from the patterning to the fixation.

However, these chiral agents have a problem that images having good resolution cannot be obtained.

As described above, in the case of a cholesteric liquid crystal phase which has a photoreactivity capable of changing orientation structures of a liquid crystal (for example, the helical pitch (the twisting power, or the twisting angle of the helix) of a liquid crystal) by the quantity of irradiation with light and which contains, for example, a nematic liquid crystal compound, a photoreactive chiral agent capable of changing the helical pitch (twisting power) thereof largely has not yet been provided in the present situation. That is, there has not yet been provided a photoreactive chiral agent which has a wide range of light wavelengths which can be selectively reflected and gives a wide selective reflection range and which can display three primary colors (B, G and R) with high color purity and good resolution.

SUMMARY OF THE INVENTION

Objects of the present invention are to solve the above-mentioned problems in the prior art.

That is, a first object of the present invention is to provide a new optically active compound which has photosensitivity and can be isomerized by light so as to be changed in structure.

A second object of the present invention is to provide a photoreactive chiral agent which can control the orientation of a liquid crystal compound and has a high rate of change in the helical pitch (twisting power) (which may be referred to as a "rate of change in twisting" hereinafter) of a liquid crystal by light. For example, in the case of a cholesteric liquid crystal phase, this object is to provide a photoreactive chiral agent which can attain various selective reflections including reflections of three primary colors (B, G and R), and can display the three primary colors with high color purity and good resolution.

A third object of the present invention is to provide a liquid crystal composition containing a photoreactive chiral agent which can change the helical pitch (twisting power) of a liquid crystal by light and which has a high rate of change in twisting; and being capable of controlling the orientation state of liquid crystal molecules largely and three-dimensionally by light so as to change optical properties. For example, in the case of a cholesteric liquid crystal phase, this object is to provide a liquid crystal composition which can exhibit various selective reflected colors including three primary colors (B, G and R) by irradiation with light, and can display the three primary colors with high color purity and good resolution.

A fourth object of the present invention is to provide a method of changing the helical structure of a liquid crystal, in which the helical pitch (twisting power) of the liquid crystal can be changed by irradiating a liquid crystal composition containing a photoreactive chiral agent having a high rate of change in twisting with light.

A fifth object of the present invention is to provide a method of fixing the helical structure of a liquid crystal, in which a liquid crystal composition containing a photoreactive chiral agent having a high rate of change in twisting is exposed imagewise to light and subsequently the helical structure can be fixed in the state that the patterned helical pitch is kept without being damaged. Particularly in the case that the phase of the liquid crystal is a cholesteric liquid crystal phase, this object is to provide a method of fixing the helical structure of the liquid crystal, in which the helical structure of the liquid crystal is fixed into a desired selective reflected color so that a color tone having high color purity can be obtained.

A sixth object of the present invention is to provide a liquid crystal color filter which contains a photoreactive chiral agent capable of changing the helical pitch (twisting power) of a liquid crystal largely by irradiation with light and which has high color purity.

A seventh object of the present invention is to provide a non-light-absorbing type optical film containing a photoreactive chiral agent capable of changing the twisting power of a liquid crystal largely by irradiation with light. For example, in the case of a cholesteric liquid crystal phase, this object is to provide an optical film having a wide selective reflection range and high color purity.

An eighth object of the present invention is to provide a recording medium which contains a photoreactive chiral agent capable of changing the twisting power of a liquid crystal largely by irradiation with light and which is capable of forming a vivid image by changing light quantity imagewise. For example, in the case that the phase of the liquid crystal is a cholesteric liquid crystal phase, this object is to provide a recording medium capable of forming an image made of selective reflected colors having various color phases and high color purity.

Means of the present invention for overcoming the problems are as follows.

A first aspect of the present invention provides an optically active polyester comprising: a constituent unit represented by the general formula (I):

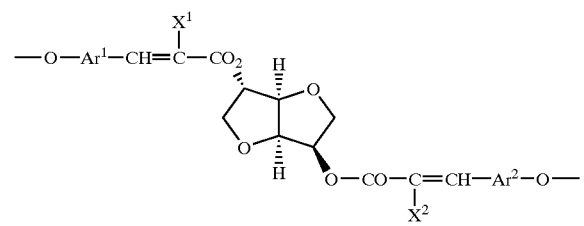

General Formula (I)

in which $Ar^1$ and $Ar^2$ each independently represents a bivalent aromatic group or a bivalent heteroaromatic group, and $X^1$ and $X^2$ each independently represents a hydrogen atom or an electron-withdrawing group; and a constituent unit represented by the following general formula (II):

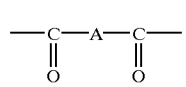

General Formula (II)

in which A represents a bivalent substituent.

A second aspect of the present invention provides an optically active polyester according to the first aspect, wherein, in the general formula (I), the substituents represented by $Ar^1$ and $Ar^2$ are the same as one another, and the substituents represented by $X^1$ and $X^2$ are the same as one another and are each a hydrogen atom or a cyano group.

A third aspect of the present invention provides an optically active polyester according to the first aspect, wherein, in the general formula (II), A represents a bivalent aromatic group.

A fourth aspect of the present invention provides an optically active polyester according to the first aspect, further comprising a constituent unit represented by the following general formula (III):

—O—B—O—  General Formula (III)

in which B represents a bivalent substituent.

A fifth aspect of the present invention provides an optically active polyester according to the first aspect, wherein the constituent unit represented by the general formula (I) comprises a content thereof relative to all constituent components of from 10 to 90% by mol.

A sixth aspect of the present invention provides an optically active polyester according to the first aspect, wherein the constituent unit represented by the general formula (I) comprises a diol component, the constituent unit represented by the general formula (II) comprises a dicarboxylic acid component, and a composition ratio of the diol component/the dicarboxylic acid component is in the range from 80/20 to 20/80.

A seventh aspect of the present invention provides an optically active polyester according to the first aspect, wherein the optically active polyester comprises a polystyrene-equivalent number-average molecular weight of from 2,000 to 100,000.

An eighth aspect of the present invention provides a photoreactive chiral agent comprising an optically active polyester which includes: a constituent unit represented by the following general formula (I):

General Formula (I)

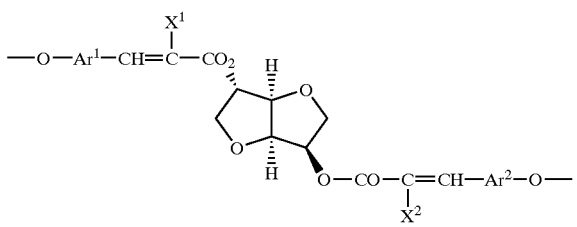

in which $Ar^1$ and $Ar^2$ each independently represents a bivalent aromatic group or a bivalent heteroaromatic group, and $X^1$ and $X^2$ each independently represents a hydrogen atom or an electron-withdrawing group; and a constituent unit represented by the following general formula (II):

General Formula (II)

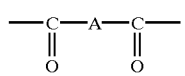

in which A represents a bivalent substituent.

A ninth aspect of the present invention provides a liquid crystal composition comprising a liquid crystal compound and at least one optically active polyester which includes: a constituent unit represented by the following general formula (I):

General Formula (I)

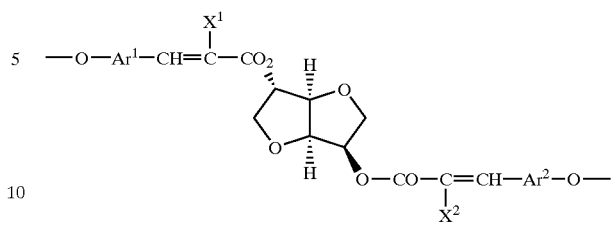

in which $Ar^1$ and $Ar^2$ each independently represents a bivalent aromatic group or a bivalent heteroaromatic group, and $X^1$ and $X^2$ each independently represents a hydrogen atom or an electron-withdrawing group; and a constituent unit represented by the following general formula General Formula (II)

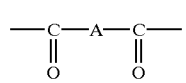

in which A represents a bivalent substituent.

A tenth aspect of the present invention provides a liquid crystal composition according to the ninth aspect, wherein the liquid crystal compound is a nematic liquid crystal compound.

An eleventh aspect of the present invention provides a liquid crystal composition according to the ninth aspect, wherein the content of the optically active polyester in the liquid crystal composition is from 0.1 to 30% by mass.

A twelfth aspect of the present invention provides a liquid crystal composition according to the ninth aspect, wherein the liquid crystal compound has at least one polymerizable group, the composition further comprising a photopolymerization initiator.

A thirteenth aspect of the present invention provides a liquid crystal composition according to the twelfth, which further comprises a polymerizable monomer.

A fourteenth aspect of the present invention provides a liquid crystal composition according to the twelfth aspect, wherein the optically active polyester and the photopolymerization initiator each comprises a photosensitivity wavelength range, and the photosensitivity wavelength ranges are substantially different from each other.

A fifteenth aspect of the present invention provides a method for changing helical structure of a liquid crystal, the method comprising the steps of: preparing a liquid crystal composition including a liquid crystal compound and at least one optically active polyester which includes a constituent unit represented by the following general formula (I):

General Formula (I)

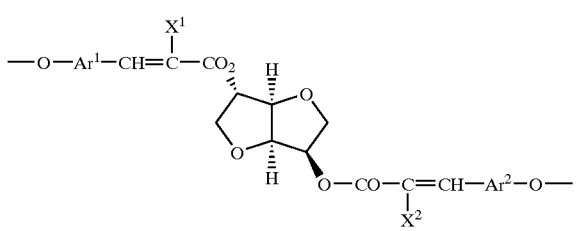

in which $Ar^1$ and $Ar^2$ each independently represents a bivalent aromatic group or a bivalent heteroaromatic group, and $X^1$ and $X^2$ each independently represents a hydrogen atom or an electron-withdrawing group, and a constituent unit represented by the following general formula (II):

General Formula (II)

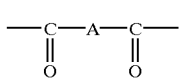

in which A represents a bivalent substituent; and irradiating the liquid crystal composition with light for changing the structure of the optically active polyester.

A sixteenth aspect of the present invention provides a method for fixing helical structure of a liquid crystal, the method comprising the steps of: preparing a liquid crystal composition including a liquid crystal compound, a photopolymerization initiator and at least one optically active polyester which includes a constituent unit represented by the following general formula (I):

General Formula (I)

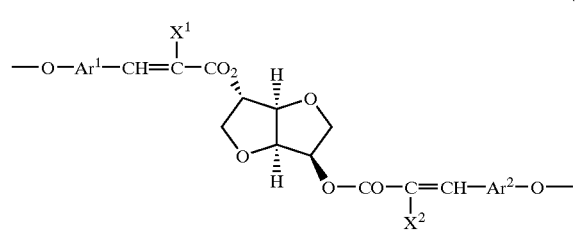

in which $Ar^1$ and $Ar^2$ each independently represents a bivalent aromatic group or a bivalent heteroaromatic group, and $X^1$ and $X^2$ each independently represents a hydrogen atom or an electron-withdrawing group, and a constituent unit represented by the following general formula (II):

General Formula (II)

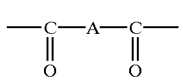

in which A represents a bivalent substituent; irradiating the liquid crystal composition with light in a photosensitivity wavelength range of the optically active polyester; and then, irradiating the liquid crystal composition with light in a photosensitivity wavelength range of the photopolymerization initiator for carrying out photopolymerization.

A seventeenth aspect of the present invention provides a liquid crystal color filter comprising a liquid crystal compound and at least one optically active polyester which includes: a constituent unit represented by the following general formula (I):

General Formula (I)

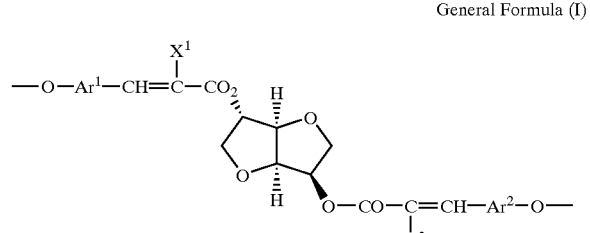

in which $Ar^1$ and $Ar^2$ each independently represents a bivalent aromatic group or a bivalent heteroaromatic group, and $X^1$ and $X^2$ each independently represents a hydrogen atom or an electron-withdrawing group; and a constituent unit represented by the following general formula (II):

General Formula (II)

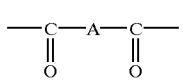

in which A represents a bivalent substituent.

An eighteenth aspect of the present invention provides an optical film comprising a liquid crystal compound and at least one optically active polyester which includes: a constituent unit represented by the following general formula (I):

General Formula (I)

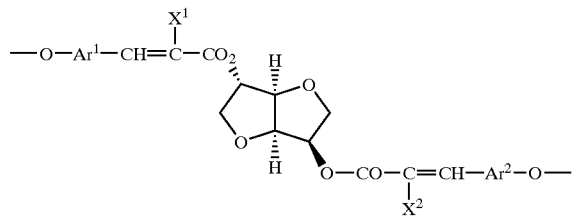

in which $Ar^1$ and $Ar^2$ each independently represents a bivalent aromatic group or a bivalent heteroaromatic group, and $X^1$ and $X^2$ each independently represents a hydrogen atom or an electron-withdrawing group; and a constituent unit represented by the following general formula (II):

General Formula (II)

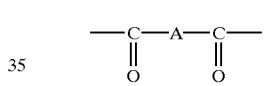

in which A represents a bivalent substituent.

A nineteenth aspect of the present invention provides a recording medium comprising a liquid crystal compound and at least one optically active polyester which includes: a constituent unit represented by the following general formula (I):

General Formula (I)

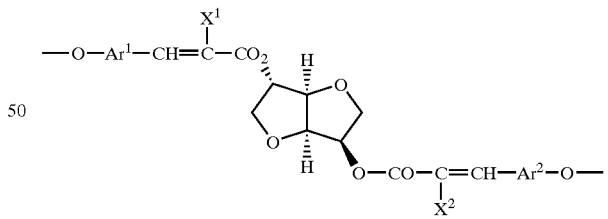

in which $Ar^1$ and $Ar^2$ each independently represents a bivalent aromatic group or a bivalent heteroaromatic group, and $X^1$ and $X^2$ each independently represents a hydrogen atom or an electron-withdrawing group; and a constituent unit represented by the following general formula General Formula (II)

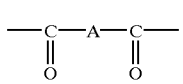

in which A represents a bivalent substituent.

DESCRIPTION OF THE PREFERRED EMBODIMENTS

Figure 1A:
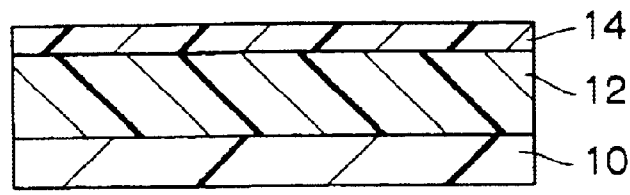
FIGS. 1A to 1I are schematic views illustrating parts of the method of producing a liquid crystal color filter of the present invention.

The present invention will be described in detail hereinafter.

Optically Active Polyester

The optically active polyester of the present invention comprises at least constituent units represented by the general formula (I) and the general formula (II):

General Formula (I)

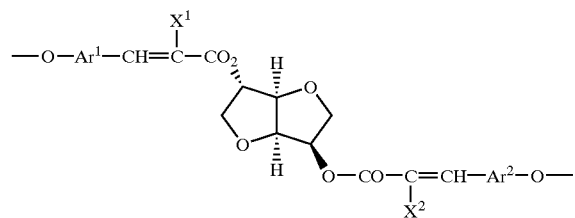

wherein $Ar^1$ and $Ar^2$ each independently represents a bivalent aromatic group or a bivalent heteroaromatic group, and $X^1$ and $X^2$ each independently represents a hydrogen atom or an electron-withdrawing group, General Formula (II)

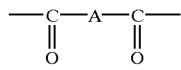

wherein A represents a bivalent substituent.

The following will describe the constituent unit represented by the general formula (I).

The bivalent aromatic group represented by $Ar^1$ and $Ar^2$ is preferably a group having 6 to 30 carbon atoms, and is more preferably a group having 6 to 20 carbon atoms.

Among the above-mentioned bivalent aromatic groups, groups represented by the following are more preferred:

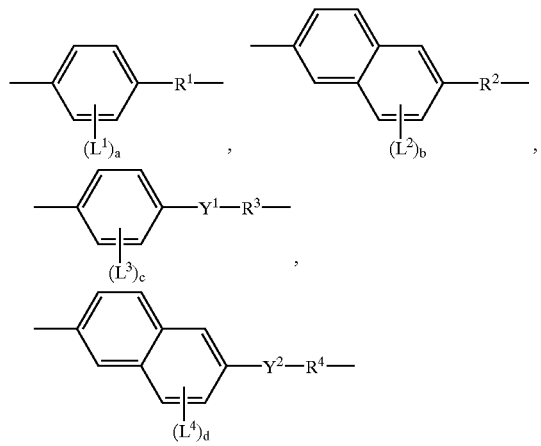

In the above-mentioned formulae, $R^1$ and $R^2$ are each a group bonding to the oxygen atom in the general formula (I), and are each a single bond or a 1,4-phenylene group. One or more CH groups in the above-mentioned group may be substituted with N(s). Alternatively, $R^1$ and $R^2$ are each a naphthalene-2,6-diyl group. These groups may not be substituted, or may be substituted with one or more halogen atoms or alkyl or alkoxy groups having 1 to 6 carbon atoms. Of them, a single bond and a 1,4-phenylene group are preferred, and a single bond is more preferred.

In the above-mentioned formulae, $R^3$ and $R^4$ are each independently a group bonding to the oxygen atom in the general formula (I), and have the same meanings as $R^1$ and $R^2$ except that they are not single bonds. Of them, a 1,4-phenylene group is preferred.

In the above-mentioned formulae, $Y^1$ and $Y^2$ each independently represents an ethenylene or ethynylene group which may have no substituent or may have a substituent. The substituent of the ethenylene group may be an alkyl group having 1 to 6 carbon atoms, an alkoxycarbonyl group having 2 to 10 carbon atoms, an aryl group having 6 to 16 carbon atoms or a cyano group. A non-substituted ethenylene group or ethynylene group is preferred.

In the above-mentioned formulae, $L^1$ to $L^4$ are each preferably a halogen atom, an alkyl group having 1 to 6 carbon atoms, or an alkoxy group having 1 to 6 carbon atoms. An alkoxy group having 1 to 6 carbon atoms is more preferred.

In the above-mentioned formulae, a to d each independently represents an integer of 0 and 1 to 4, and each independently preferably represents 0 or 1.

Particularly preferred examples of the bivalent aromatic group are as follows:

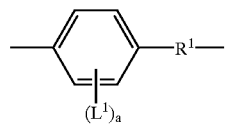

Examples of the bivalent aromatic group include the following. In the following formulae, the right side thereof is bonded to the oxygen atom, and $L^5$ to $L^7$ each independently represents a halogen atom, or an alkyl or alkoxy group having 1 to 6 carbon atoms.

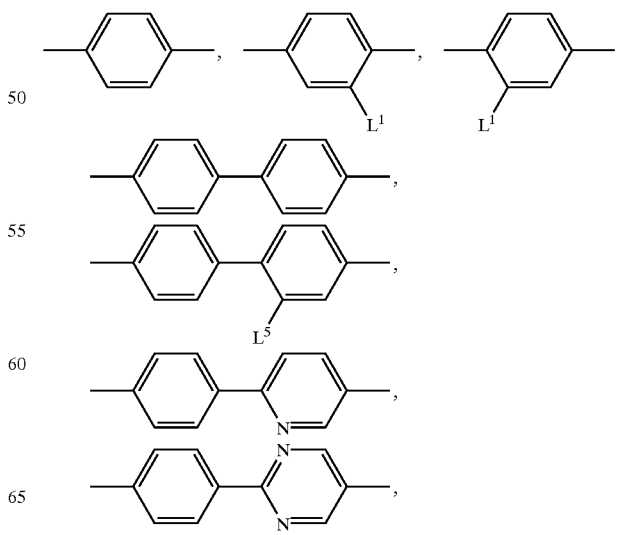

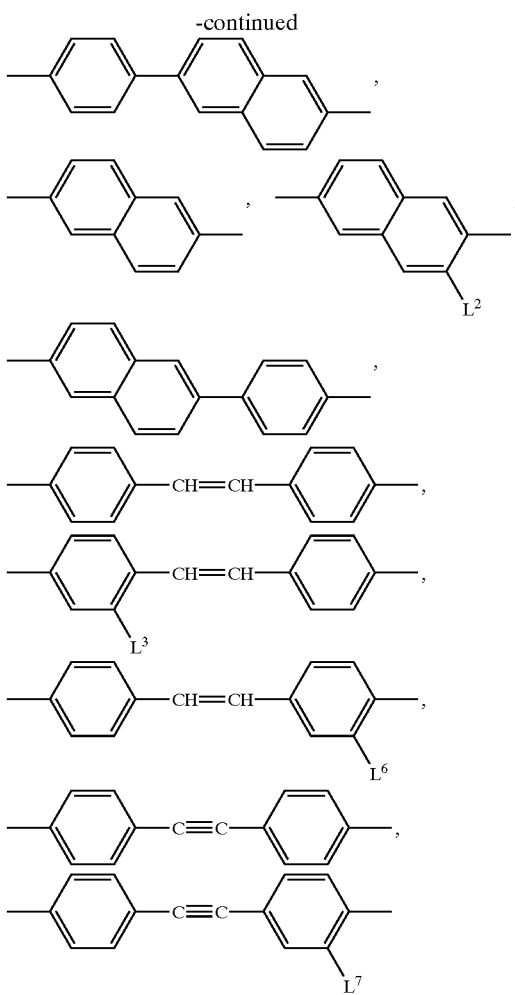

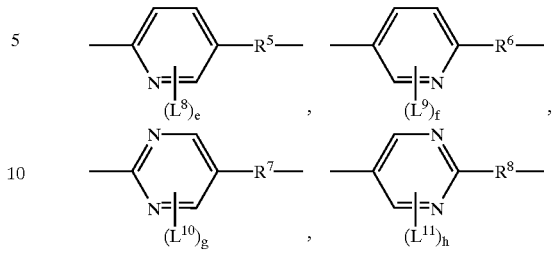

The halogen atom mentioned as the substituents in $R^1$ to $R^4$ and the halogen atom represented by $L^1$ to $L^7$ are each preferably a fluorine, chlorine or bromine atom, and more preferably, a fluorine atom.

The alkyl group mentioned as the substituent in $R^1$ to $R^4$, the alkyl group mentioned as the substituent in $Y^1$ to $Y^2$, and the alkyl group represented by $L^1$ to $L^7$ may be linear or branched, and may be substituted with a halogen atom or an alkoxy group.

The alkoxy group mentioned as the substituent in $R^1$ to $R^4$, and the alkoxy group represented by $L^1$ to $L^7$ may be linear or branched, and may be substituted with a halogen atom or an alkoxy group.

The alkoxycarbonyl group mentioned as the substituent in $Y^1$ and $Y^2$ may be linear or branched, and may be substituted with a halogen atom, an alkoxy group, an alkenyl group or an aryl group. The aryl group mentioned as the substituent in $Y^1$ and $Y^2$ may be substituted with a halogen atom, an alkyl group, an alkoxy group, an alkoxycarbonyl group or a cyano group.

The bivalent heteroaromatic group represented by $Ar^1$ and $Ar^2$ is preferably a group having 4 to 20 carbon atoms, and more preferably a group having 4 to 16 carbon atoms. Nitrogen-containing heteroaromatic groups are preferred, and a pyridyl group and a pyrimidyl group are more preferred.

Such a heteroaromatic group may be a furyl group or a benzofuranyl group. Of them, a pyridyl group and a pyrimidyl group are more preferred.

Among such bivalent heteroaromatic groups, groups represented by the following formulae are preferred:

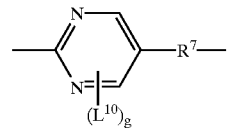

wherein $R^5$ to $R^8$ are each a group bonding to the oxygen atom in the general formula (I), and have the same meanings as $R^1$ to $R^4$; $L^8$ to $L^{11}$ each have the same meanings as $L^1$ to $L^4$; and e to h represent each independently an integer of 0, 1 or 2, and preferably 0.

Of them, a bivalent heteroaromatic group represented by the following formula is more preferred:

Examples of the bivalent heteroaromatic group include the following. In the following formulae, the right side thereof is bonded to the oxygen atom, and $L^{12}$ represents a halogen atom or an alkyl or alkoxy group having 1 to 6 carbon atoms.

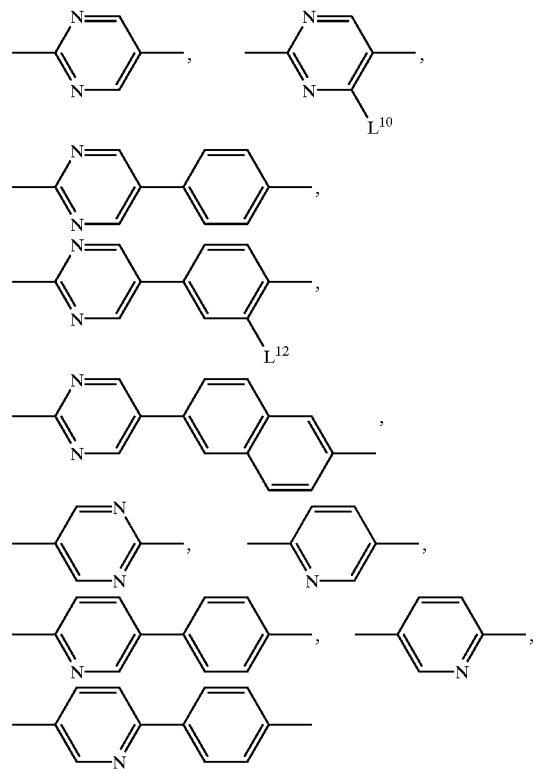

The halogen atom mentioned as the substituent in $R^5$ to $R^8$ and the halogen atom represented by $L^8$ to $L^{12}$ are each preferably a fluorine, chlorine or bromine atom, and more preferably a fluorine atom.

The alkyl group mentioned as the substituent in $R^5$ to $R^8$, and the alkyl group represented by $L^8$ to $L^{12}$ may be linear or branched, and may be substituted with a halogen atom or an alkoxy group.

The alkoxy group mentioned as the substituent in $R^5$ to $R^8$, and the alkoxy group represented by $L^8$ to $L^{12}$ may be linear or branched, and may be substituted with a halogen atom or an alkoxy group.

Among the above-mentioned $Ar^1$ and $Ar^2$, a bivalent aromatic group is more preferred, and more preferably $Ar^1$ and $Ar^2$ represents the same group.

In the general formula (I), the electron-withdrawing group represented by $X^1$ and $X^2$ is preferably a cyano, alkoxycarbonyl, aryloxycarbonyl, alkylsulfonyl or arylsulfonyl group. A cyano group is more preferred.

The alkoxycarbonyl group is preferably an alkoxycarbonyl group having 2 to 30 carbon atoms, and more preferably an alkoxycarbonyl group having 2 to 20 carbon atoms.

The alkylsulfonyl group is preferably an alkylsulfonyl group having 1 to 30 carbon atoms, and more preferably an alkylsulfonyl group having 1 to 20 carbon atoms.

The aryloxycarbonyl group is preferably an aryloxycarbonyl group having 2 to 30 carbon atoms, and more preferably an aryloxycarbonyl group having 2 to 20 carbon atoms.

The arylsulfonyl group is preferably an arylsulfonyl group having 2 to 30 carbon atoms, and more preferably an arylsulfonyl group having 2 to 20 carbon atoms.

These may have a substituent, and examples of the substituent include halogen atoms, and alkyl groups.

$X^1$ and $X^2$ are each preferably a hydrogen atom or a cyano group. $X^1$ and $X^2$ are more preferably the same substituent.

The following will describe specific examples of the constituent unit represented by the general formula (I) (compound examples 1-1 to 12, 2-1 to 12, 3-1 to 8, 4-1 to 8, and 5-1 to 8). In the present invention, however, the constituent is not limited thereto.

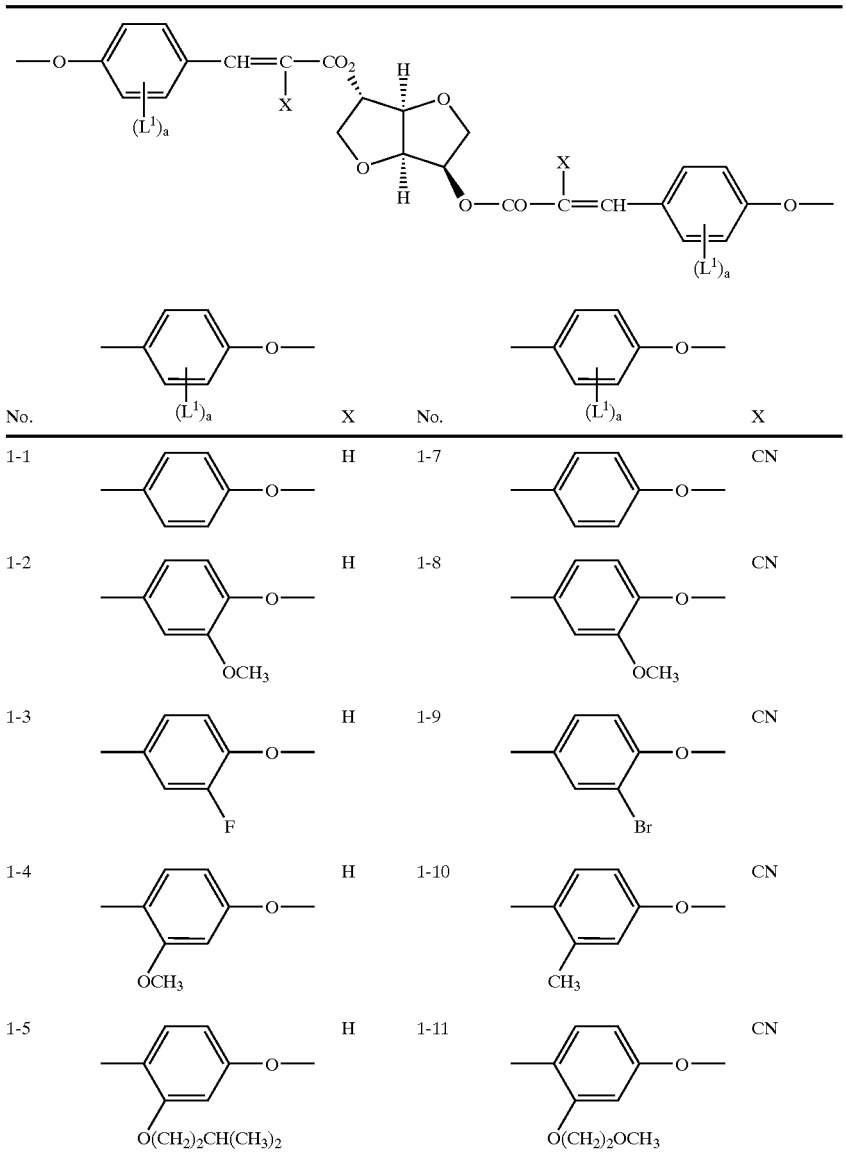

-continued
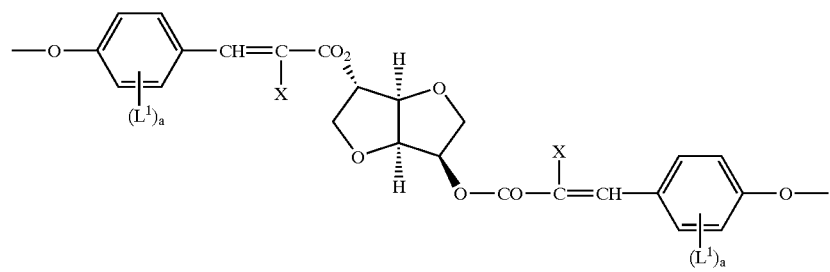
| No. | 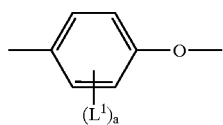 | X | No. | 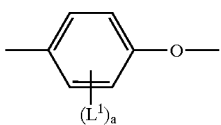 | X |
|---|---|---|---|---|---|
| 1-6 | 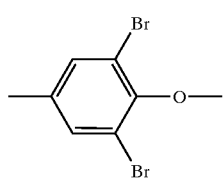 | H | 1-12 | 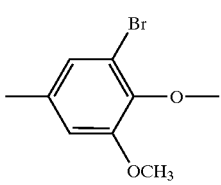 | CN |
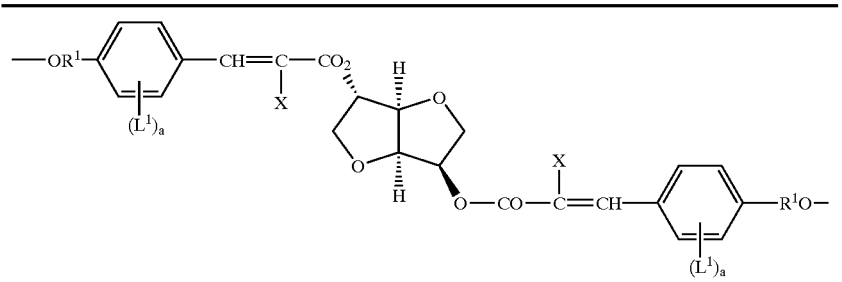
| No. | 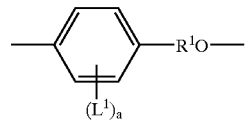 | X |
|---|---|---|
| 2-1 | 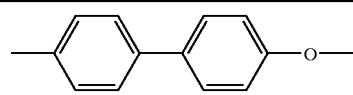 | H |
| 2-2 | 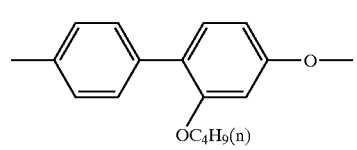 | H |
| 2-3 | 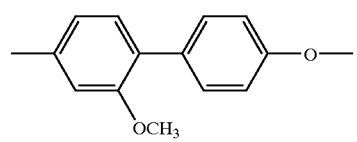 | H |
| 2-4 | 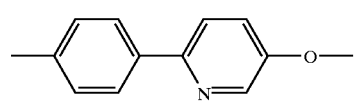 | H |

-continued
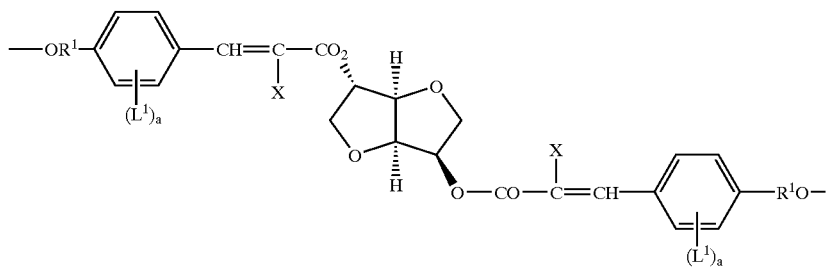
| No. | 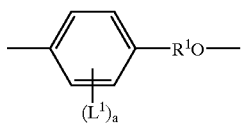 | X |
|---|---|---|
| 2-5 | 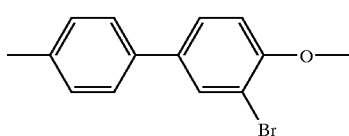 | H |
| 2-6 | 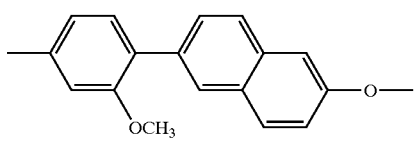 | H |
| 2-7 | 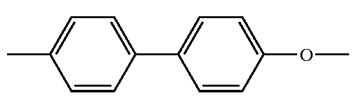 | CN |
| 2-8 | 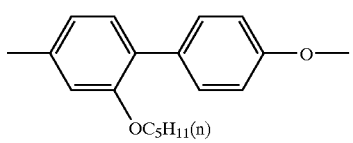 | CN |
| 2-9 | 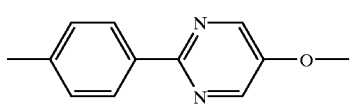 | CN |
| 2-10 | 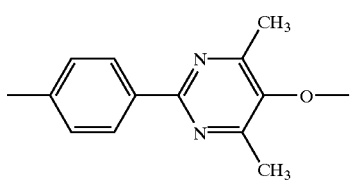 | CN |
| 2-11 | 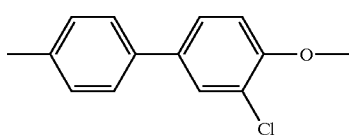 | CN |
| 2-12 | 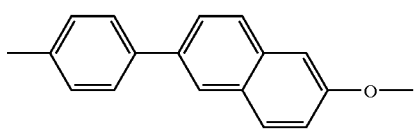 | CN |

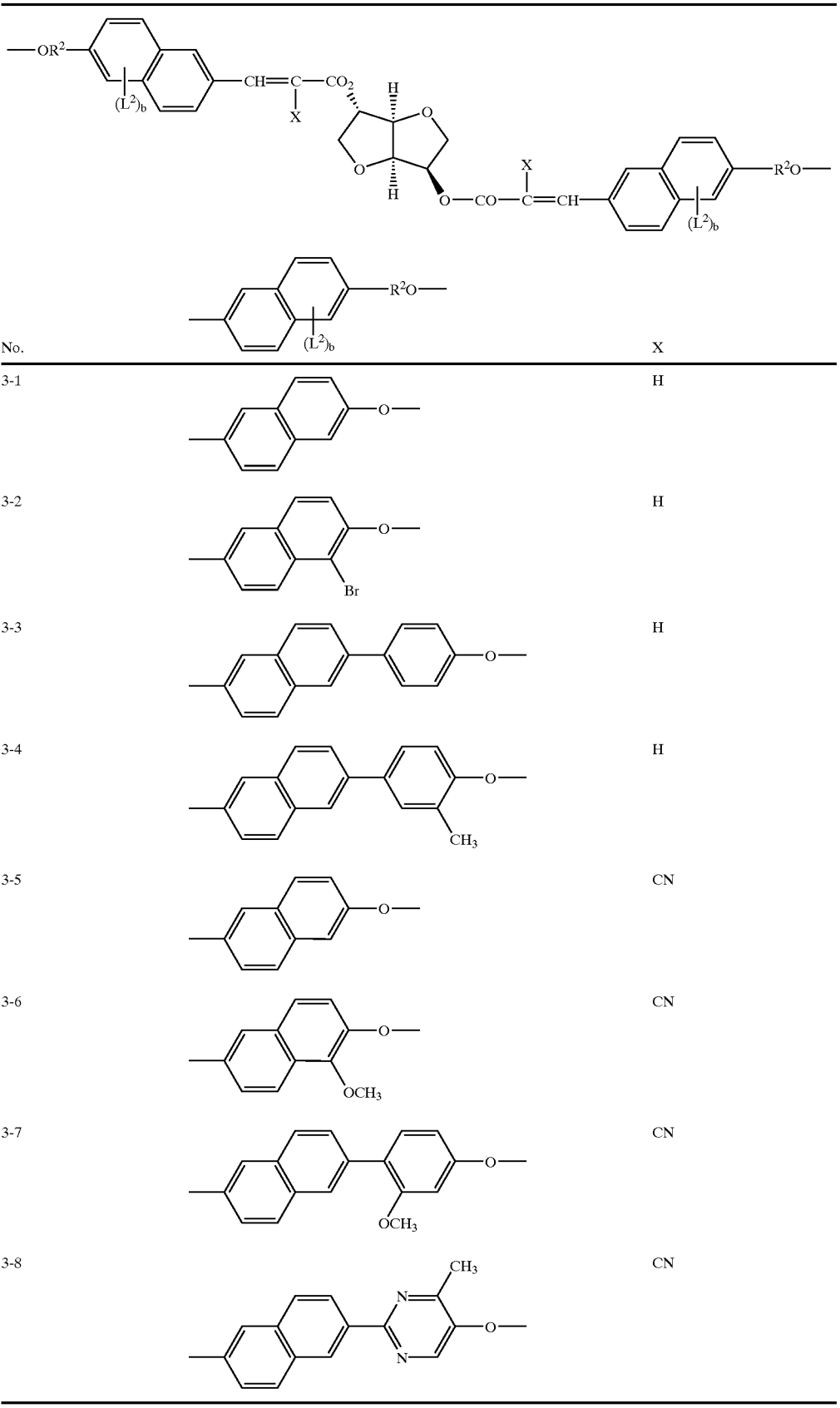

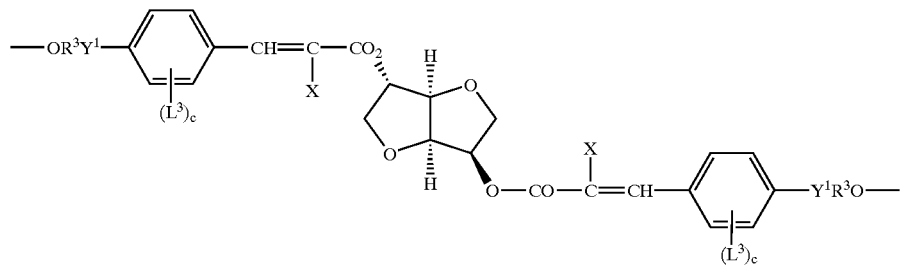
| No. | (structure) | X |
|---|---|---|
| 4-1 | —⟨C₆H₄⟩—CH=CH—⟨C₆H₄⟩—O— | H |
| 4-2 | —⟨C₆H₄⟩—C(CN)=CH—⟨naphthyl⟩—O— | H |
| 4-3 | —⟨C₆H₃(F)⟩—C≡C—⟨C₆H₄⟩—O— | H |
| 4-4 | —⟨C₆H₄⟩—C(CH₃)=CH—⟨C₆H₃(OCH₃)⟩—O— | H |
| 4-5 | —⟨C₆H₄⟩—CH=CH—⟨C₆H₄⟩—O— | CN |
| 4-6 | —⟨C₆H₄⟩—CH=CH—⟨naphthyl⟩—O— | CN |
| 4-7 | —⟨C₆H₄⟩—C(CO₂C₂H₅)=CH—⟨C₆H₄⟩—O— | CN |
| 4-8 | —⟨C₆H₄⟩—C=C—⟨C₆H₄⟩—O— | CN |

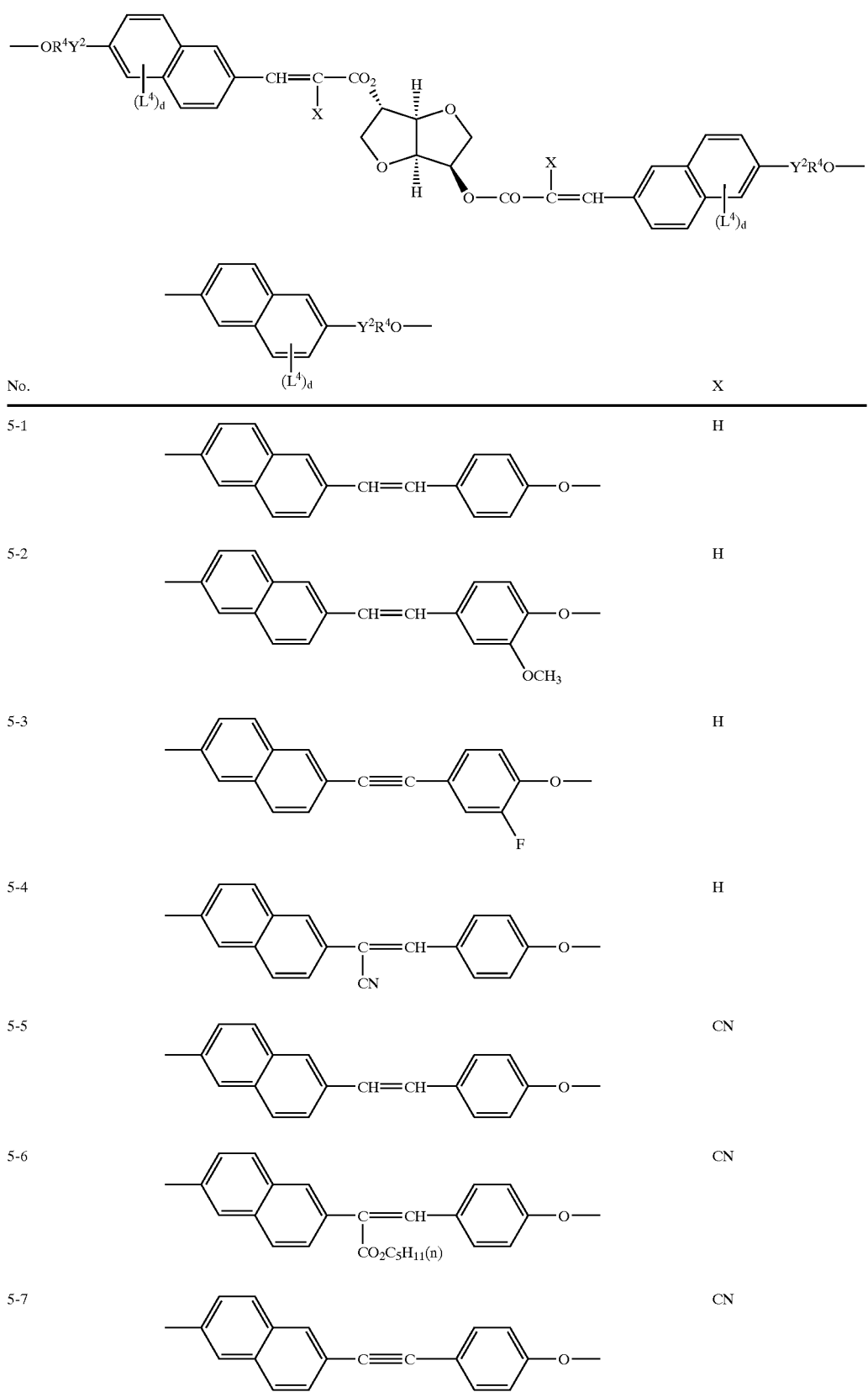

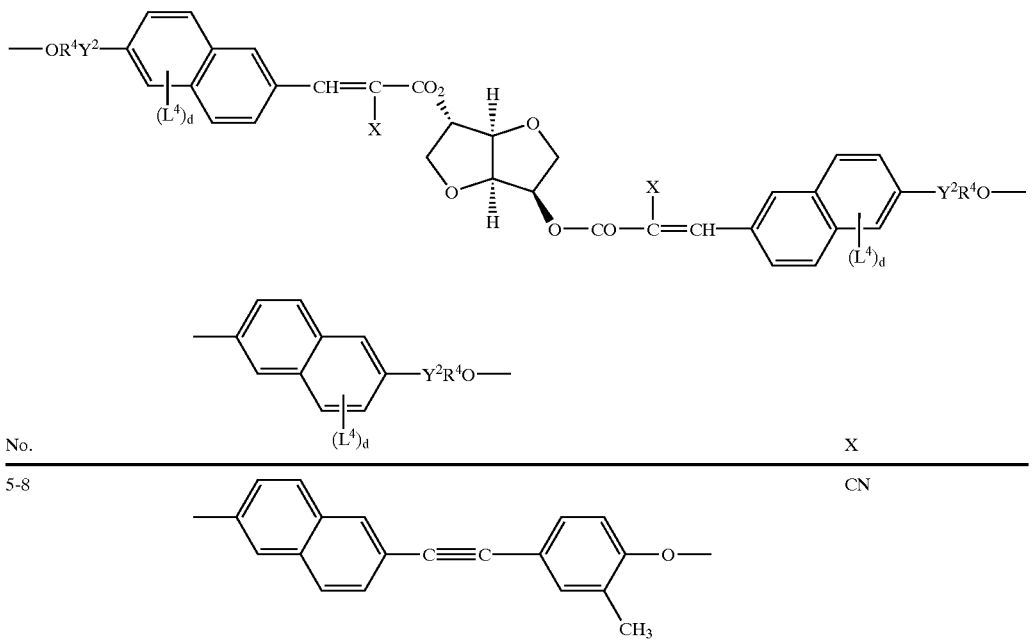

The following will describe the constituent unit represented by the general formula (II)

The bivalent substituent represented by A is preferably a bivalent substituent having 1 to 40 carbon atoms, and more preferably a bivalent aromatic group having 6 to 40 carbon atoms. The bivalent aromatic group means not only a group containing an aromatic ring such as a benzene ring or a naphthalene ring but also a group having a double bond or a triplet bond conjugated with such an aromatic ring. If the part bonded to the carbonyl group in the general formula (II) is an aromatic group, a bivalent substituent other than the aromatic group may be interposed therebetween.

When A in the general formula (II), which is a constituent unit of the present invention, represents a bivalent aromatic group (hereinafter referred to as an aromatic dicarboxylic acid component), the following (6-1 to 6-6) are preferred. Of them, the compounds 6-1, 6-2 and 6-3 are more preferred.

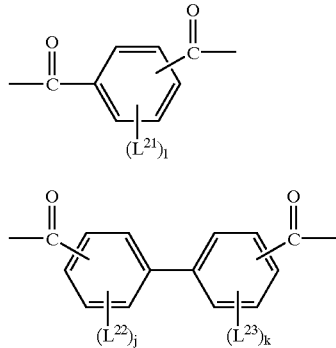

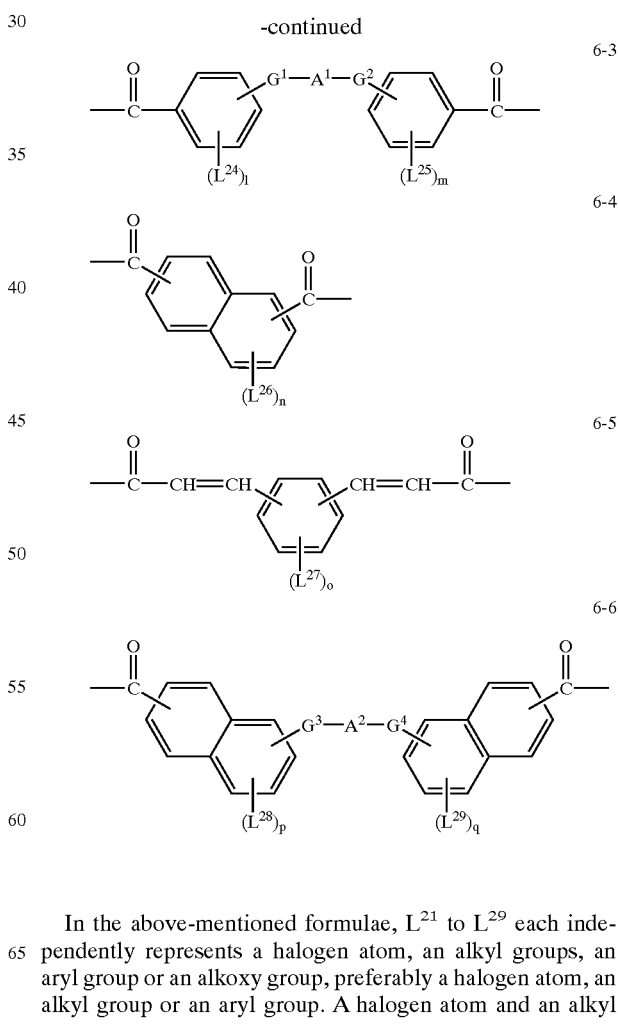

In the above-mentioned formulae, $L^{21}$ to $L^{29}$ each independently represents a halogen atom, an alkyl groups, an aryl group or an alkoxy group, preferably a halogen atom, an alkyl group or an aryl group. A halogen atom and an alkyl group are more preferred. And i to g each independently represents an integer of 0, 1, 2 or 3, and preferably 0.

In the above-mentioned formulae, $G^1$ to $G^4$ each independently represents, a single bond, —O—, —S—, —O—CO—, —COO—, —O—COO, —O—CO—N($R^{11}$)—, —N($R^{12}$)—COO—, —N($R^{13}$)—CO—, —CO—N($R^{14}$)—, or —N($R^{15}$)—CO—N($R^{16}$)—. Of them, single bonds, —O—, —O—CO—N($R^{11}$)—, —N($R^{12}$)—COO—, —N($R^{13}$)—CO—, and —N($R^{15}$)—CO—N($R^{16}$)— are preferred. A single bond, —O—, and —N($R^{13}$)—CO— are more preferred.

The alkyl group represented by $R^{11}$ to $R^{16}$, which may be substituted with a substituent or may not be substituted, is preferably an alkyl group having 1 to 12 carbon atoms, and more preferably an alkyl group having 1 to 8 carbon atoms. Examples of the substituent, if the alkyl group is substituted, include halogen atoms, alkoxy groups and aryl groups.

$A^1$ and $A^2$ in the above-mentioned formulae each independently represents an alkylene, alkenylene, alkynylene or arylene group. Of them, alkylene, alkenylene and arylene groups are preferred. Alkylene and arylene groups are more preferred.

Specific examples of the constituent represented by the general formula (II) include the following groups 7-1 to 7-18. Of them, the compounds 7-1 to 7-8 are preferred.

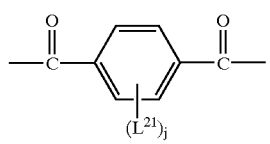

7-1

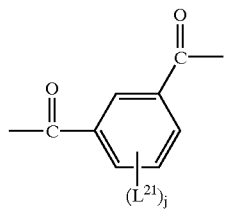

7-2

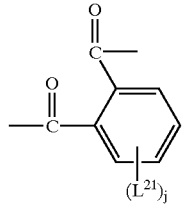

7-3

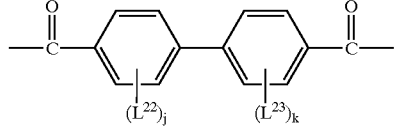

7-4

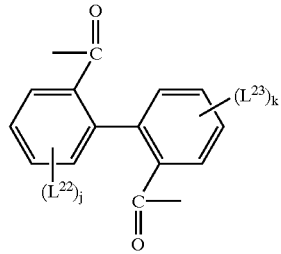

7-5

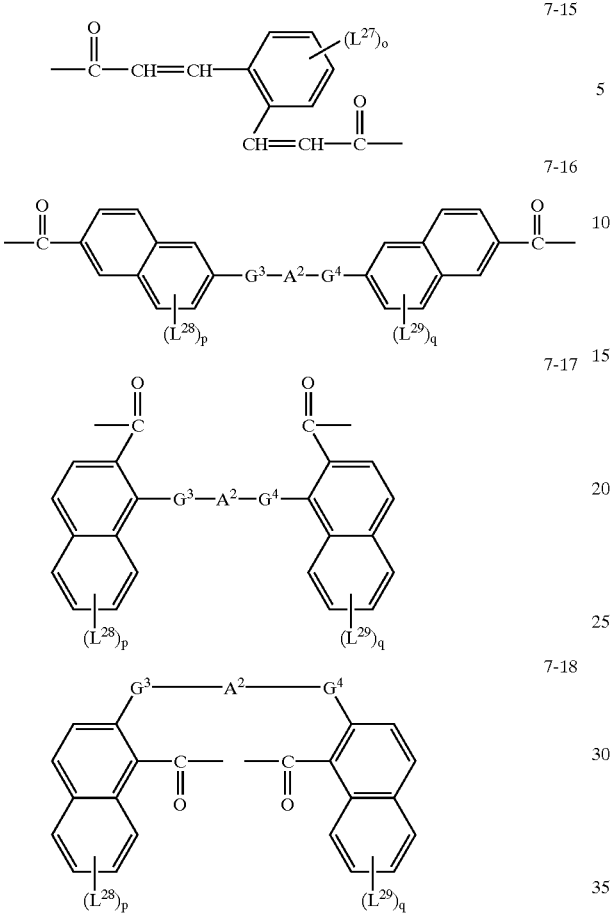

The halogen atom represented by $L^{21}$ to $L^{29}$ in the above-mentioned formulae is preferably a fluorine, chlorine or bromine atom, and more preferably a fluorine or chlorine atom.

The alkyl group represented by $L^{21}$ to $L^{29}$ in the above-mentioned formulae, which may be substituted or may not be substituted, is preferably an alkyl group having 1 to 12 carbon atoms, and more preferably an alkyl group having 1 to 8 carbon atoms. Examples of the substituent, if the alkyl group is substituted, include halogen atoms, aryl groups and alkoxy groups.

The aryl group represented by $L^{21}$ to $L^{29}$ in the above-mentioned formulae, which may be substituted or may not be substituted, is preferably an aryl group having 6 to 20 carbon atoms, and more preferably an aryl group having 6 to 15 carbon atoms. Examples of the substituent, if the aryl group is substituted, include halogen atoms, aryl groups and alkoxy groups.

The alkoxy group represented by $L^{21}$ to $L^{29}$ in the above-mentioned formulae, which may be substituted or may not be substituted, is preferably an alkoxy group having 1 to 12 carbon atoms, and more preferably an alkoxy group having 1 to 8 carbon atoms. Examples of the substituent, if the alkoxy group is substituted, include halogen atoms, aryl groups and alkoxy groups.

In the above-mentioned formulae, $A^1$ and $A^2$ each independently represents a bivalent linking group, and examples thereof include alkylene, alkenylene, alkynylene and arylene groups.

The alkylene group represented by $A^1$ and $A^2$, which may have a substituent and may be linear, branched or cyclic, is preferably an alkylene group having 1 to 28 carbon atoms, and more preferably an alkylene group having 2 to 20 carbon atoms. Examples of the substituent include halogen atoms, and aryl and alkoxy groups. One $CH_2$, or two or more $CH_2$ which are not adjacent may be substituted with an oxygen or sulfur atom, or the $G^1$ group. Moreover, the alkylene chain may contain an aryl group.

The alkenylene group represented by $A^1$ and $A^2$, which may have a substituent and may be linear, branched or cyclic, is preferably an alkenylene group having 2 to 28 carbon atoms, and more preferably an alkenylene group having 2 to 20 carbon atoms. Examples of the substituent include halogen atoms, and aryl and alkoxy groups.

The alkynylene group represented by $A^1$ and $A^2$ is preferably an alkynylene group having 2 to 28 carbon atoms, and more preferably an alkynylene group having 2 to 20 carbon atoms.

The arylene group represented by $A^1$ and $A^2$, which may have a substituent, is preferably an arylene group having 6 to 28 carbon atoms, and more preferably an arylene group having 6 to 20 carbon atoms. Examples of the substituent include halogen atoms, and aryl and alkoxy groups.

The following will illustrate specific examples (compound examples A-1 to A-38) of the aromatic dicarboxylic acid component used in the present invention. In the present invention, however, the component is not limited thereto.

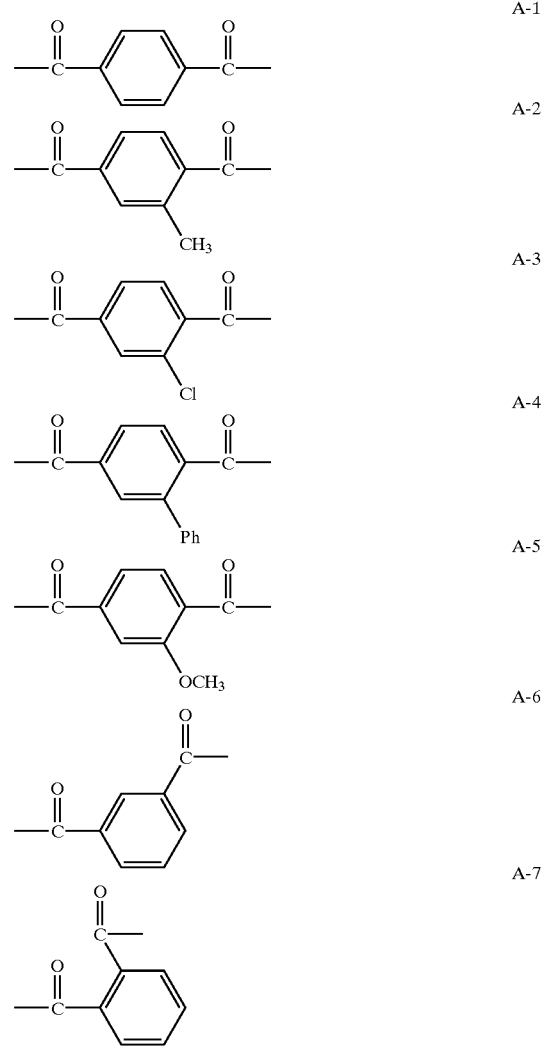

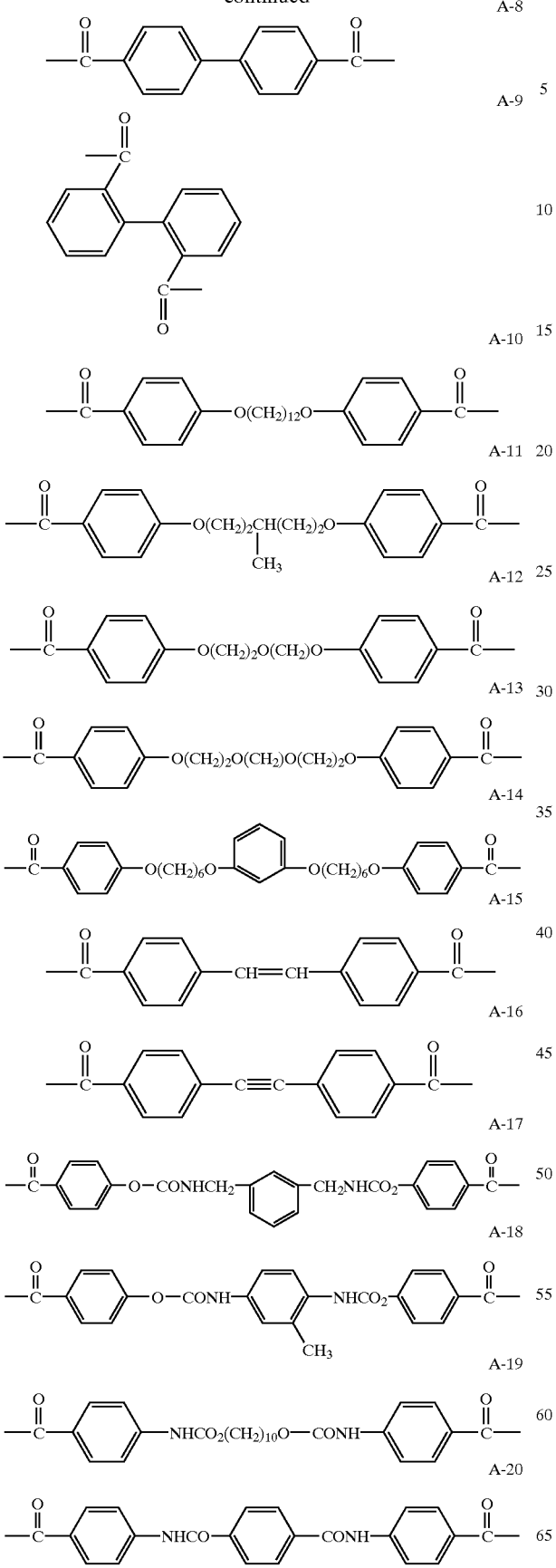
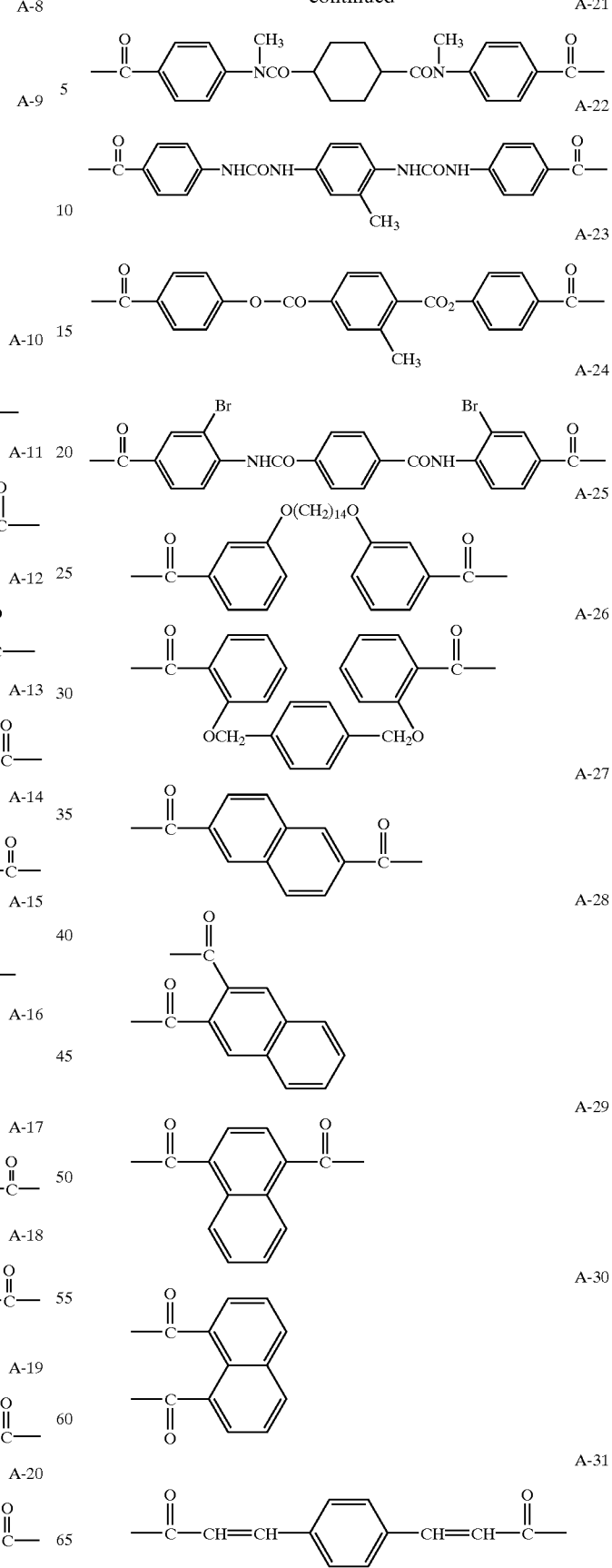

A-32
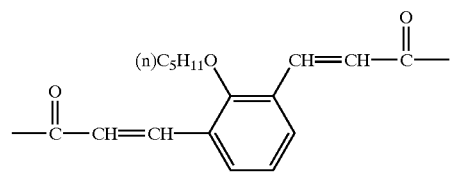

A-33
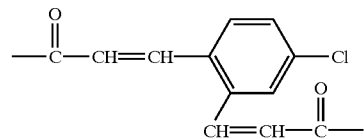

A-34
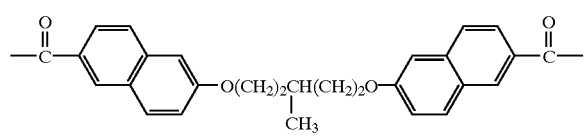

A-35
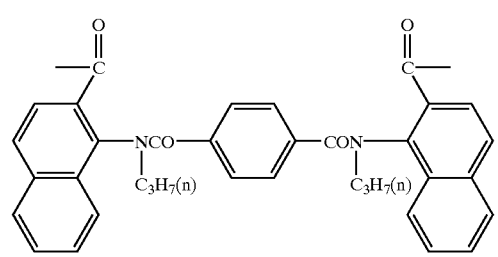

A-36
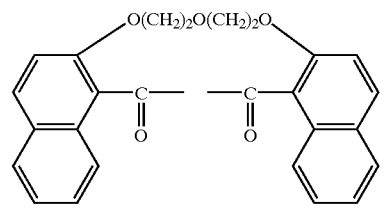

A-37
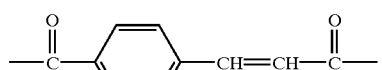

A-38
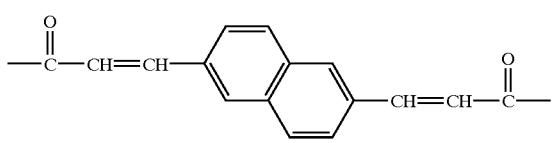

The constituent unit represented by the general formula (II) in the present invention may contain the above-mentioned aromatic dicarboxylic acid, and a component wherein A is a bivalent aliphatic group in the general formula (II) (hereinafter referred to as an aliphatic dicarboxylic acid component). Alternatively, an aliphatic dicarboxylic acid component alone may be used. The bivalent aliphatic group means an alkylene, alkenylene or alkynylene group.

The alkylene, alkenylene or alkynylene group has the same meanings as the alkylene, alkenylene or alkynylene group represented by $A^1$ and $A^2$.

The following will illustrate specific examples (compound examples B-1 to B-7) of the aliphatic dicarboxylic acid component used in the present invention. In the present invention, however, the component is not limited thereto.

B-1
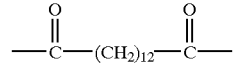

B-2
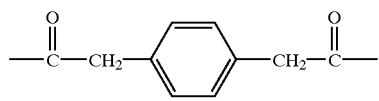

B-3
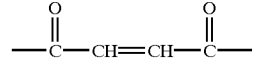

B-4
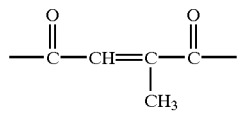

B-5
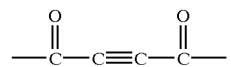

B-6
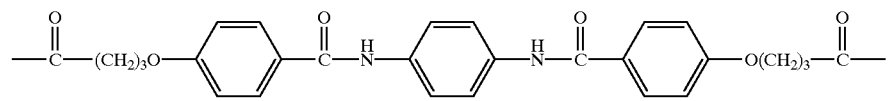

B-7
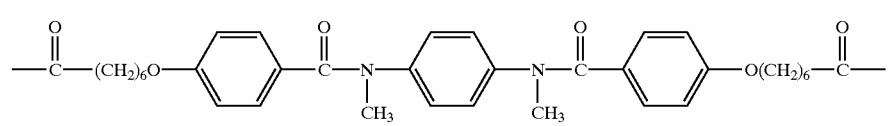

The present invention may contain the dicarboxylic acid component, and a monocarboxylic acid component. The content of the monocarboxylic acid component, when used, is preferably from 1 to 40%, more preferably from 1 to 30% by mol of all constituent components.

The monocarboxylic acid component may be an aromatic carboxylic acid or an aliphatic carboxylic, and examples include the following compounds (C-1) to (C-8). (C-1) acetic acid, (C-2) hexanoic acid, (C-3) oleic acid, (C-4) cinnamic acid, (C-5) benzoic acid, (C-6) p-toluic acid, (C-7) p-fluorobenzoic acid,

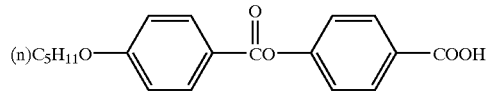

(C-8)

The optically active polyester of the present invention may contain a constituent unit represented by the general formula (III) (hereinafter referred to as a bivalent alcohol component). However, the general formula (III) never represents the general formula (I). This bivalent alcohol component is preferably a component wherein the bivalent substituent represented by B is a bivalent aromatic group, that is, an aromatic bivalent alcohol component. The aromatic bivalent alcohol component may be a component wherein a hydroxyl group is bonded directly to an aromatic ring such as a benzene ring or a naphthalene ring, or may be a component wherein a hydroxyl group is bonded to such an aromatic ring through a double bond or a triplet bond conjugated with the aromatic ring. If the part bonded to the oxygen atom in the general formula (III) is an aromatic group, a bivalent substituent other than the aromatic group may be interposed therebetween.

Preferred examples of the aromatic bivalent alcohol component used in the present invention are the following compounds C-1 to C-5. Of them, the compounds C-1 and C-2 are more preferred.

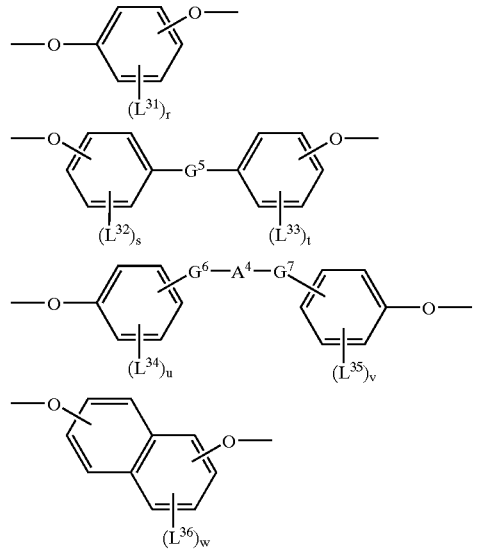

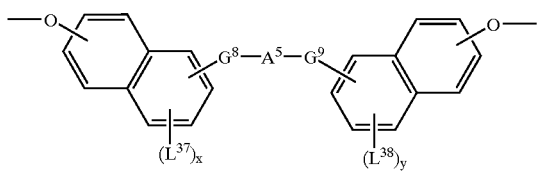

In above-mentioned formulae, $L^{31}$ to $L^{38}$ each independently represents a halogen atom, or an alkyl aryl, alkoxycarbonyl or cyano group, preferably a halogen atom, or an alkyl, aryl or cyano group, and more preferably a halogen atom or an alkyl group. And r to y each independently represents an integer of 0, 1, 2 or 3, preferably 0, 1 or 2, and more preferably 0 or 1.

In above-mentioned formulae, $G^6$ to $G^9$ each independently represents a single bond, —O—, —S—, —O—CO—, —COO—, —O—COO, —O—CO—N($R^{21}$)—, —N($R^{22}$)—COO—, —N($R^{23}$)—CO—, —CO—N($R^{24}$)—, or —N($R^{25}$)—CO—N($R^{26}$)—. Of them, a single bond, —S—, —COO—, —N($R^{23}$)—CO—, —CO—N($R^{24}$)—, and —N($R^{25}$)—CO—N($R^{26}$)— are preferred. A single bond, —S—, and —N($R^{23}$)—CO— are more preferred. $R^{21}$ to $R^{26}$ are each independently a hydrogen atom or an alkyl group, and they bond to $A^4$ or $A^5$ by their bonding hand at the right side.

In the above-mentioned formulae, $A^4$ and $A^5$ are the same as $A^1$ and $A^2$ respectively.

In the above-mentioned formulae, $G^5$ represents a single bond, —O—, —S—, —SO_2— or —CO—. Of them, a single bond, —O—, —SO_2— and —CO— are preferred, and a single bond, —O— and —SO_2— more preferred.

The alkyl group represented by $R^{21}$ to $R^{26}$ has the same meanings as the alkyl group represented by $R^{11}$ to $R^{16}$ respectively.

Specific examples of the aromatic bivalent alcohol components in the present invention are the following groups C-6 to C-17. Of them, the groups C-6 to C-9 are preferred.

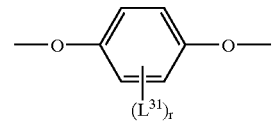

C-6

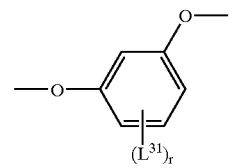

C-7

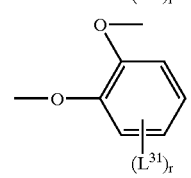

C-8

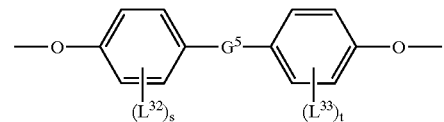

C-9

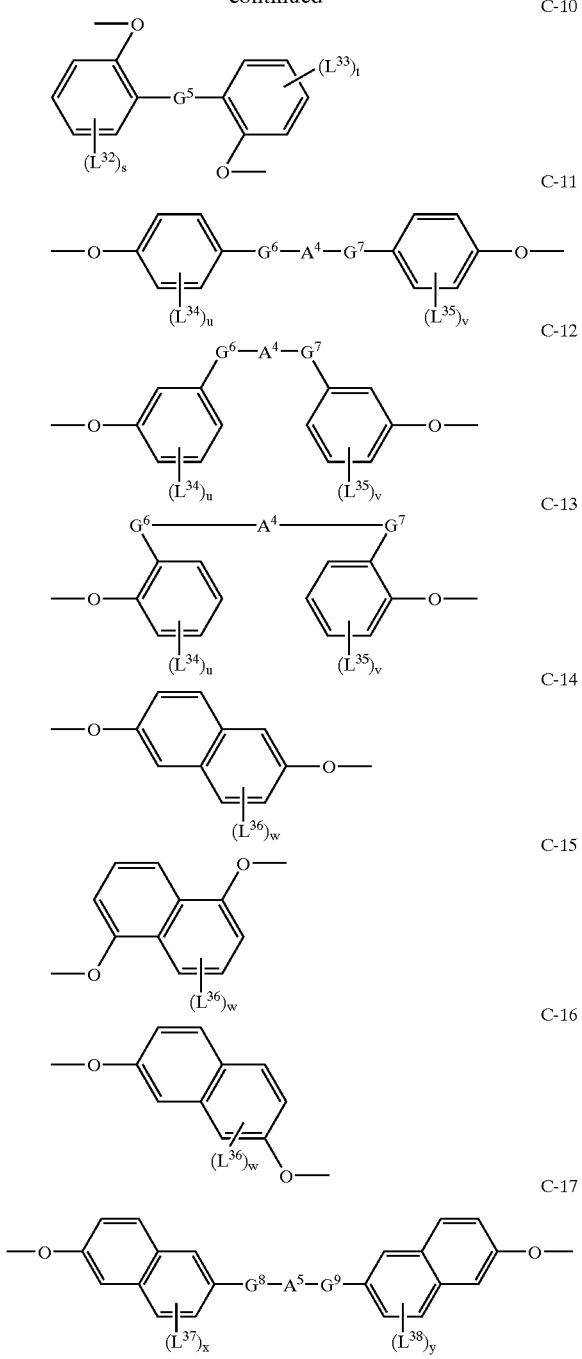

In above-mentioned formulae, $L^{31}$ to $L^{38}$ each independently represents a halogen atom, or an alkyl, aryl, or alkoxy group, preferably a halogen atom, or an alkyl or aryl group, and more preferably a halogen atom or an alkyl group. And r to y each independently represents an integer of 1, 2 or 3, preferably 0.

The halogen atom represented by $L^{31}$ to $L^{38}$ in the above-mentioned formulae is preferably a fluorine, chlorine or bromine atom, and more preferably a fluorine or chlorine atom.

The alkyl group represented by $L^{31}$ to $L^{38}$ in the above-mentioned formulae, which may be substituted or may not be substituted, is preferably an alkyl group having 1 to 12 carbon atoms, and more preferably an alkyl group having 1 to 8 carbon atoms. Examples of the substituent, if the alkyl group is substituted, include halogen atoms, aryl groups and alkoxy groups.

The aryl group represented by $L^{31}$ to $L^{38}$ in the above-mentioned formulae, which may be substituted or may not be substituted, is preferably an aryl group having 6 to 20 carbon atoms, and more preferably an aryl group having 6 to 15 carbon atoms. Examples of the substituent, if the aryl group is substituted, include halogen atoms, alkyl groups and alkoxy groups.

The alkoxy group represented by $L^{31}$ to $L^{38}$ in the above-mentioned formulae, which may be substituted or may not be substituted, is preferably an alkoxy group having 1 to 12 carbon atoms, and more preferably an alkoxy group having 1 to 8 carbon atoms. Examples of the substituent, if the alkoxy group is substituted, include halogen atoms, aryl groups and alkoxy groups.

The alkoxycarbonyl group represented by $L^{31}$ to $L^{38}$ in the above-mentioned formulae, which may be substituted or may not be substituted, is preferably an alkoxycarbonyl group having 2 to 13 carbon atoms, and more preferably an alkoxycarbonyl group having 2 to 9 carbon atoms. Examples of the substituent, if the alkoxycarbonyl group is substituted, include halogen atoms, aryl groups and alkoxy groups.

In the above-mentioned formulae, $A^4$ and $A^5$ each independently represents a bivalent linking group, and examples thereof include alkylene, alkenylene, alkynylene and arylene groups.

The alkylene group represented by $A^4$ and $A^5$, which may have a substituent and may be linear, branched or cyclic, is preferably an alkylene group having 1 to 40 carbon atoms, and more preferably an alkylene group having 2 to 32 carbon atoms. Examples of the substituent include halogen atoms, and aryl and alkoxy groups. One $CH_2$, or two or more $CH_2$ which are not adjacent may be substituted with an oxygen or sulfur atom, or the $G^1$ group. Moreover, the alkylene chain may contain an aryl group.

The alkenylene group represented by $A^4$ and $A^5$, which may have a substituent and may be linear, branched or cyclic, is preferably an alkenylene group having 2 to 30 carbon atoms, and more preferably an alkenylene group having 2 to 20 carbon atoms. Examples of the substituent include halogen atoms, and aryl groups and alkoxy groups.

The alkynylene group represented by $A^4$ and $A^5$ is preferably an alkynylene group having 2 to 40 carbon atoms, and more preferably an alkynylene group having 2 to 32 carbon atoms.

The arylene group represented by $A^4$ and $A^5$, which may have a substituent, is preferably an arylene group having 6 to 40 carbon atoms, and more preferably an arylene group having 6 to 32 carbon atoms. Examples of the substituent include halogen atoms, and aryl groups and alkoxy groups.

The following will illustrate specific examples (compound examples D-1 to D-25) of the aromatic diol component used in the present invention. In the present invention, however, the component is not limited thereto.

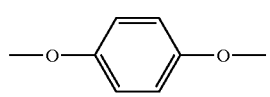

D-1

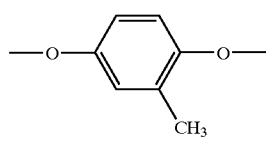

D-2

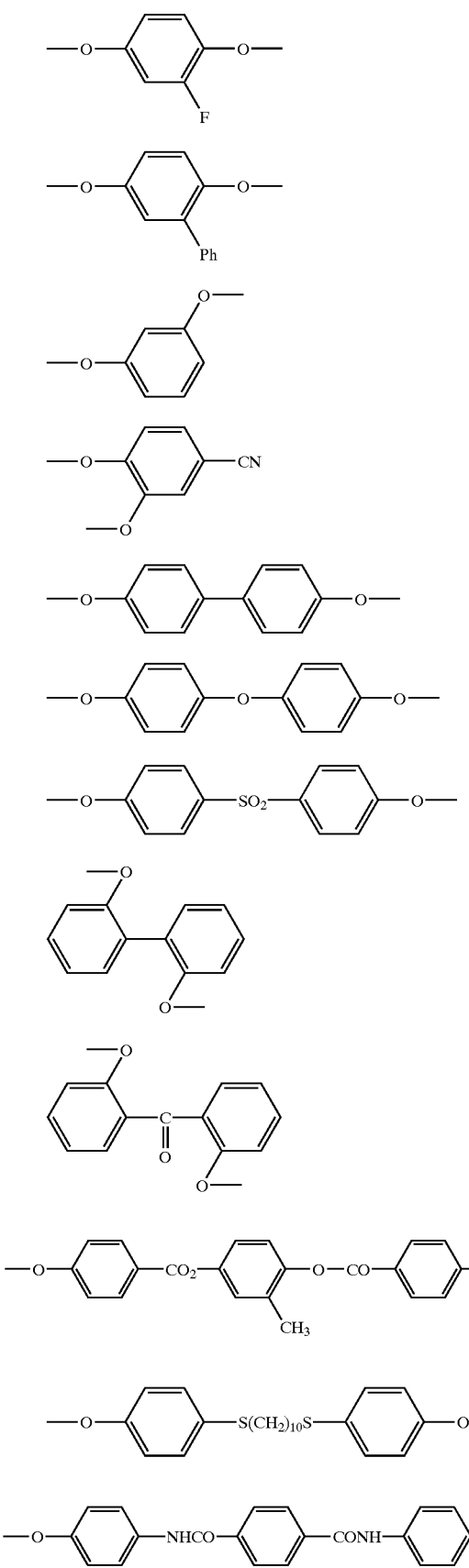
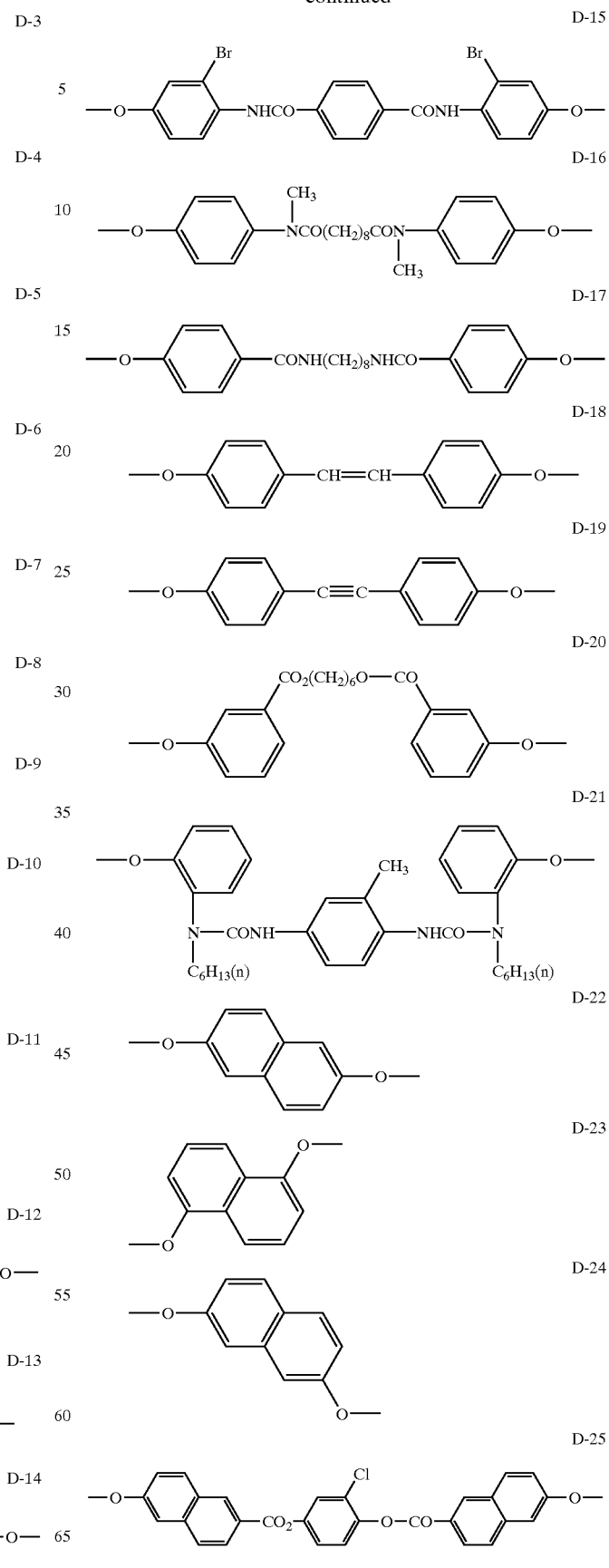

The constituent unit represented by the general formula (III) of the present invention may contain a component wherein B in the general formula (III) is a bivalent aliphatic group (hereinafter referred to as an aliphatic diol component), together with the above-mentioned aromatic diol component. Alternatively, only the diol component and the aliphatic diol component of the general formula (I) may be used.

The aliphatic diol component means any diol component other than the diol component of the general formula (I) and the above-mentioned aromatic diol component.

As such an aliphatic diol component, B is preferably an alkylene, alkenylene or alkynylene group. The alkylene, alkenylene and alkynylene groups have the same meanings as those represented by $A^1$ or $A^2$.

The following will illustrate specific examples (compound examples E-1 to E-9) of the aliphatic diol component. In the present invention, however, the component is not limited thereto.

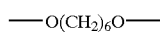
E-1

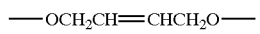
E-3

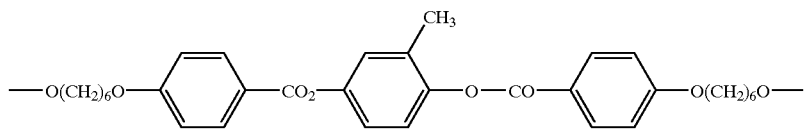

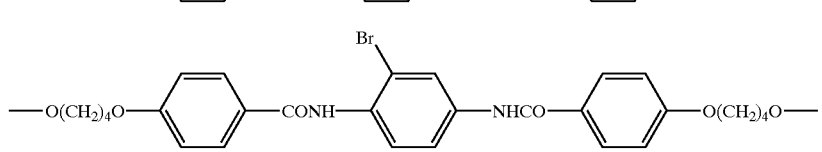

E-8

The present invention may contain a monoalcohol component together with the above-mentioned diol component. The content of the monoalcohol, when used, is preferably from 1 to 40%, more preferably from 1 to 30% by mol of all constituent components.

This monoalcohol component may be an aromatic alcohol or aliphatic alcohol. Specific examples thereof are the following (F-1) to (F-10). (F-1) methanol, (F-2) ethanol, (F-3) propanol, (F-4) decyl alcohol, (F—5) allyl alcohol, (F-6) benzyl alcohol, (F-7) phenol, (F-8) cresol, (F-9) p-methoxyphenol (F-10)
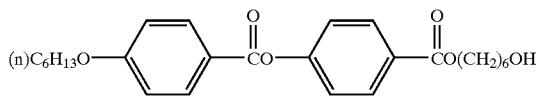

Synthesis of the Optically Active Polyester

The following will describe a method of synthesizing the optically active polyester of the present invention.

A diol corresponding to the constituent unit represented by the general formula (I) can be synthesized according to the following reaction scheme (A).

Reaction scheme (A)

Compound A

E-2

E-4

E-5

E-6

E-7

E-9

-continued

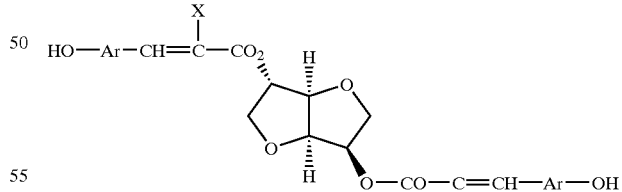

X: electron-withdrawing group
Ar: $Ar^1$ or $Ar^2$

That is, when X is an electron-withdrawing group, the diol can be synthesized by reaction of the compound (A) with an aldehyde derivative represented by HO—Ar—CHO. When X is a hydrogen atom, the diol can be synthesized according to the following reaction scheme (B).

Reaction scheme (B)

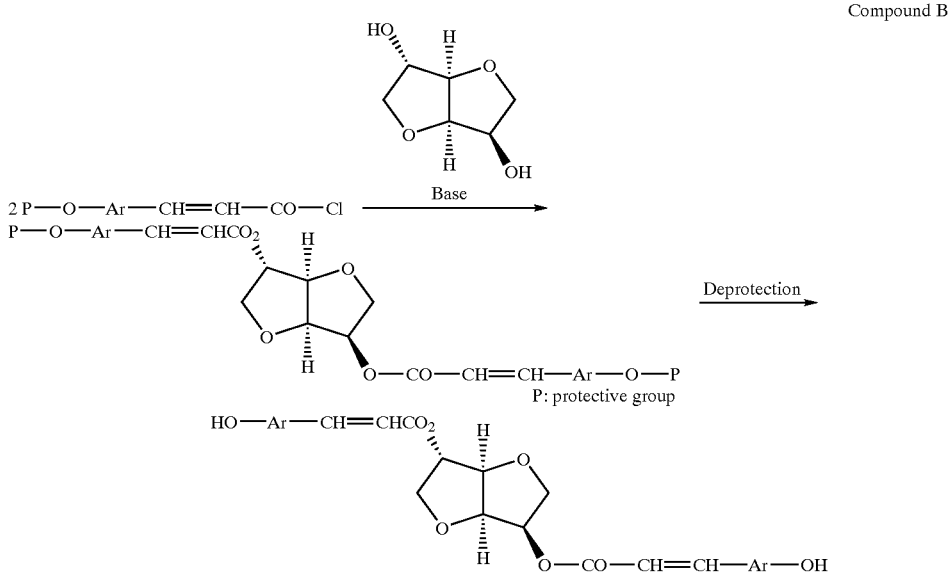

Compound B

P: protective group

That is, the diol can be synthesized by reacting a compound (B) with isosorbide and then removing a protective group represented by P.

The reaction of the compound B with isosorbide can be conducted according to the manner described in Japanese Patent Application No. 2001-5740.

It is advisable that the protective group P is a substituent which is generally known as a protective group for a hydroxide group. Examples thereof are substituents described in "Protective Group in Organic Synthesis" (John Willey & Sons Co.) pp.87–113 (1981), such as acetyl, methoxymethyl, tetrahydropyranyl and tert-butyldimethylsilyl.

The removal of the protective group P is preferably conducted by a method suitable for the protective group P itself. Details of the method of removing the protective group are described in the above-mentioned literature.

A dicarboxylic acid or a dicarboxylic acid derivative corresponding to the constituent unit represented by the general formula (II) may be a commercially available product or a product synthesized in any known manner. A diol corresponding to the constituent unit represented by the general formula (III) may also be a commercially available product or a product synthesized in any known manner.

The polyester of the present invention can be synthesized by polycondensation of the diol corresponding to the constituent unit represented by the general formula (I) and the dicarboxylic acid or dicarboxylic acid derivative corresponding to the constituent unit represented by the general formula (II). At this time, the diol corresponding to the constituent unit represented by the general formula (III), a monocarboxylic acid, a monocarboxylic acid derivative, a monoalcohol or the like may be incorporated into the reaction system.

The monocarboxylic acid component and the monoalcohol component may be present in the reaction system from the initial stage of the polycondensation reaction, or may be added to the reaction system in the middle of the reaction or for the purpose of the stop of the reaction.

The polyesterization can be conducted with reference to, for example, "New Polymer Experiments Vol.3 Synthesis/Reaction of Polymer (2), Synthesis of Condensed-type Polymer" (edited by the Society of Polymer Science, Japan) (Kyoritsu Shuppan Co., Ltd.) pp.75–95 (1996).

In the production of the polyester of the present invention, it is preferred to conduct polycondensation reaction using an acid chloride as an acid component. In this case, a base may be used. Examples of the base include triethylamine, pyridine and DBU.

Examples of a solvent include THF, DMF, N-methylpyrrolidone and acetonitrile.

The content of the constituent unit represented by the general formula (I) is preferably from 10 to 90%, more preferably from 20 to 80% by mol of all constituent components, dependently on desired HTP, molecular weight, solubility or the like.

The composition molar ratio of the diol component corresponding to the constituent unit represented by the general formula (I) to the dicarboxylic acid component corresponding to the constituent unit represented by the general formula (II) that is, the molar ratio of the (diol component)/(the dicarboxylic acid component) is preferably within the range of 80/20 to 20/80, and more preferably within the range of 70/30 to 30/70.

The number-average molecular weight (Mn) of the polyester of the present invention is preferably from 2,000 to 100,000 and more preferably from 2,000 to 50,000 in terms of polystyrene.

Photoreactive Chiral Agent

The photoreactive chiral agent of the present invention comprises an optical active polyester comprising at least constituent units represented by the general formula (I) and the general formula (II), and has characteristics capable of controlling the orientation structure of a liquid crystal compound and being isomerized by irradiation with light to change the helical pitch of the liquid crystal, that is, twisting power of the helical structure (HTP: helical twisting power). In other words, the chiral agent of the present invention is a compound causing a change in the twisting power of the helical structure (induced in a liquid crystal compound, preferably a nematic liquid crystal compound) by irradiation with light rays (ultraviolet rays/visible rays/infrared rays).

The chiral agent has, as necessary parts (molecular structural units), a chiral unit and a unit whose structure is changed by irradiation with light.

Moreover, the photoreactive chiral agent comprising the optically polyester of the present invention can change the HTP of a liquid crystal compound largely. Therefore, for example, in the case of a cholesteric liquid crystal (liquid crystal phase) wherein a nematic liquid crystal compound is used as a liquid crystal compound, selective reflections ranging within a wide wavelength range, including the wavelengths of three primary colors (i.e., blue (B), green (G) and red (R)), can be attained. Namely, the property that a given light wavelength is selectively reflected depends on the twisting angle of the helical structure of a liquid crystal molecule, and as the angle changes more largely, the range of selectively-reflected colors becomes wider and more useful.

The HTP represents the twisting power of the helical structure of liquid crystal. That is, HTP=1/(pitch×chiral agent concentration (mass fraction)). The HTP ($\mu m^{-1}$) can be obtained by measuring the helical pitch (one period of the helical structure ($\mu$m)) of a liquid crystal molecule at a temperature and then converting the resultant value from the concentration of a chiral agent.

In the case that a photoreactive chiral agent is used to form a selective reflected color on the basis of the intensity of illumination of light, the ratio of the HTP (=HTP before the illumination/HTP after the illumination) is preferably 1.5 or more and more preferably 2.5 or more when the HTP after the illumination becomes smaller. The ratio is preferably 0.7 or less and more preferably 0.4 or less when the HTP after the illumination becomes larger.

The photoreactive chiral agent of the present invention can be used together with a known chiral agent having no photoreactivity, such as a chiral compound having a twisting power depending largely on temperature.

Examples of the known chiral agent having no photoreactivity include chiral agents described in Japanese Patent Application Laid-Open (JP-A) No. 2000-44451, Japanese Patent Application National Publication No. 10-509726, WO 98/00428, Japanese Patent Application National Publication Nos. 2000-506873 and 9-506088, "Liquid Crystals" (1996, 21, 327), and "Liquid Crystals" (1998, 24, 219).

Liquid Crystal Composition

The liquid crystal composition of the present invention comprises at least one liquid crystal compound (preferably, a nematic liquid crystal compound) and at least one selected from the optically active polyesters (that is, the photoreactive chiral agents) of the present invention. The liquid crystal compound may or may not have a polymerizable group.

If necessary, the liquid crystal composition may contain other components such as a polymerizable monomer, a polymerization initiator, a binder resin, a solvent, a surfactant, a polymerization inhibitor, a thickener, a colorant, a pigment, an ultraviolet absorbent, and a gelation agent. The liquid crystal composition of the present invention preferably contains a surfactant. For example, when the liquid crystal composition in a liquid form is applied to a substrate to form a layer, the orientation state of the liquid crystal molecule in the interface between the surface of this layer and the air can be three-dimensionally controlled. Particularly in the case of a cholesteric liquid crystal phase, a selective reflected wavelength having high color purity and good resolution can be obtained.

Optically Active Polyester

The optically active polyester comprises, as a photoreactive chiral agent, an optically active polyester having at least constituent units represented by the general formula (I) and the general formula (II), so as to control the orientation structure of the liquid crystal molecule three-dimensionally. Additionally, the polyester is irradiated, into a desired pattern, with light having a desired light quantity, thereby changing the helical structure of the coexisting liquid crystal compound, preferably the coexisting nematic liquid crystal compound.

The content of the optically active polyester (photoreactive chiral agent) can be appropriately selected without any limitation. The content is preferably from about 0.1 to 30% by mass of the whole solid components of the liquid crystal composition Liquid Crystal Compound The liquid crystal compound can be appropriately selected from liquid crystal compounds, polymer liquid crystal compounds and polymerizable liquid crystal compounds having a refractive index anisotropy Δn of 0.10 to 0.40. Examples thereof include smectic liquid crystal compounds and nematic liquid crystal compounds. Of them, nematic liquid crystal compounds are preferred. For example, by using a nematic liquid crystal compound as the liquid crystal compound together with the optically active polyester represented by the general formula (I), a cholesteric liquid crystal composition (cholesteric liquid crystal phase) can be prepared.

The liquid crystal compound can be oriented by using an oriented substrate subjected to orienting treatment such as rubbing treatment while the liquid crystal compound is melted and in a liquid crystal state. In the case that the liquid crystal state is fixed into a solid phase, cooling, polymerization or the like manner can be used.

Specific examples of the liquid crystal compound include the following. In the present invention, however, the liquid crystal compound is not limited thereto.

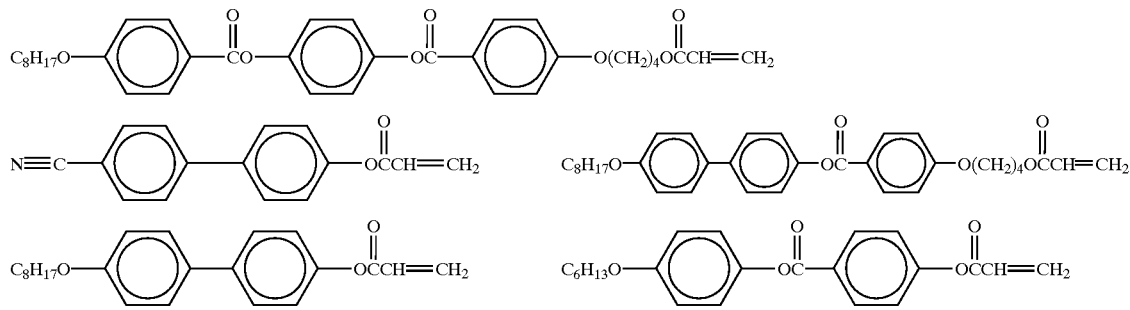

47

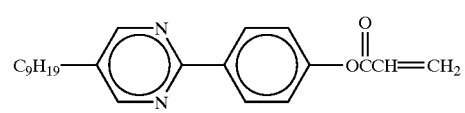
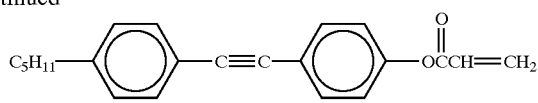

-continued

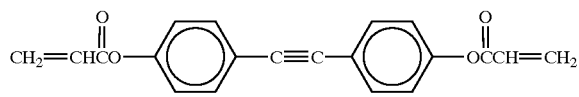
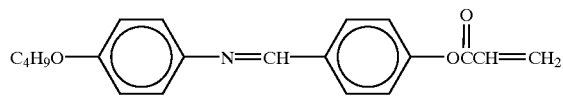

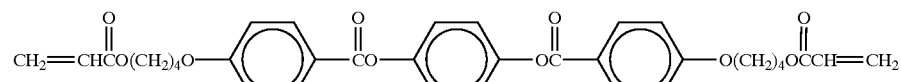

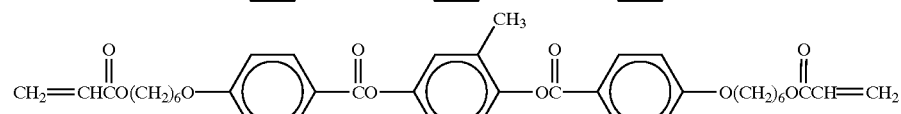

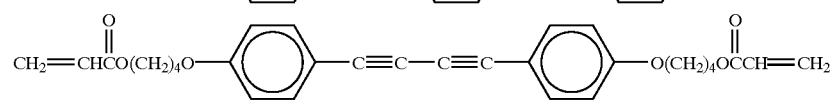

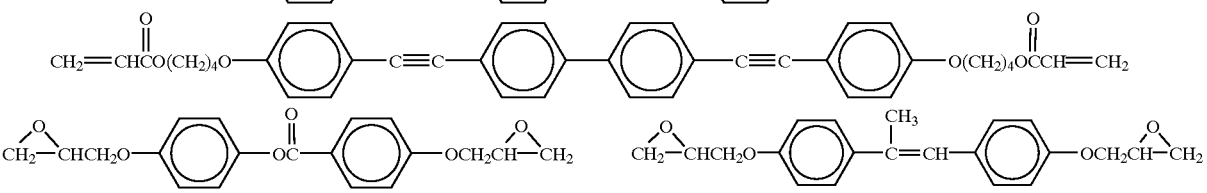

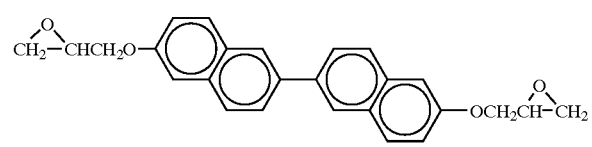
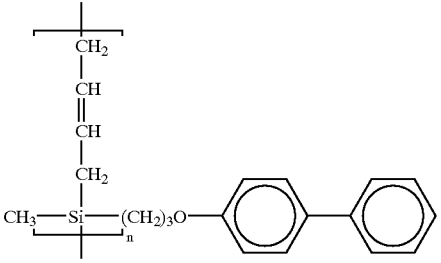

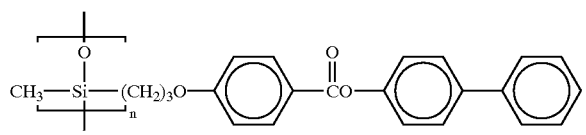

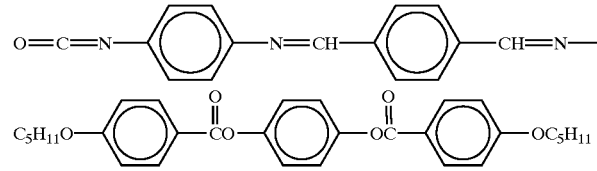
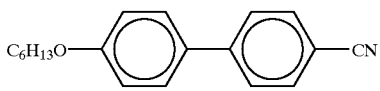

In the above-mentioned formulae, n represents an integer of 1 to 1000.

Other preferred examples include the above-illustrated compounds where the aromatic liking group is changed into any one of the following structures.

-continued

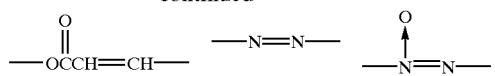

Among these compounds, liquid crystal compounds having in their molecule a polymerizable group or a crosslinking group are preferred in order to keep sufficient hardening capability and improve the heat resistance of a layer to be formed.

The content of the liquid crystal compound is preferably from 30 to 99.9% and more preferably from 50 to 95% by mass of the whole solid content of the liquid crystal composition. If the content is less than 30% by mass, the orientation of the liquid crystal composition may be insufficient. Particularly in the case of a cholesteric liquid crystal, a desired selective reflected color may not be obtained.

Photopolymerization Initiator

The liquid crystal composition of the present invention may contain a photopolymerization initiator. The use of the photopolymerization initiator makes it possible to promote polymerization reaction of the polymerizable group, and further fix the helical structure after the helical pitch (twisting power) of the liquid crystal is changed by irradiation with light, thereby improving the strength of the liquid crystal composition after the fixation. When polymerization reaction of a polymerizable liquid crystal compound is used to fix the helical structure of the liquid crystal, it is preferred to add the photopolymerization initiator.

For example, in the case that the liquid crystal phase is a cholesteric liquid crystal phase, a desired helical pitch can stably be obtained so that a selective reflected color having high color purity and good resolution can be ensured.

The photopolymerization initiator may be appropriately selected from known photopolymerization initiators. Examples thereof include p-methoxyphenyl-2,4-bis(trichloromethyl)-s-triazine, 2-(p-butoxystyryl)-5-trichloromethyl-1,3,4-oxadiazole, 9-phenylacridine, 9,10-dimethylbenzphenazine, benzophenone/Michler's ketone, hexarylbiimidazole/mercaptobenzimidazole, benzyl dimethyl ketal, thioxantone/amine, triarylsulfonium hexafluoro phosphate, bisacylphosphine oxides such as bis(2,4,6-trimethylbenzoyl)-phenylphosphine oxide described in JP-A No. 10-29997, and acylphosphine oxides, such as Lucirin TPO, described in DE No. 4230555 and the like.

The added amount of the photopolymerization initiator is preferably from 0.1 to 20% and more preferably from 0.5 to 5% by mass of the whole solid content of the liquid crystal composition. If the added amount is less than 0.1% by mass, the hardening efficiency of the composition is low at the time of irradiation of the composition with light so that a long time is required for the polymerization thereof. If the added amount is more than 20% by mass, the light transmittance may be poor within the range from ultraviolet rays to visible rays.

As described above, the liquid crystal composition of the present invention comprises the optically active polyester having at least constituent units represented by the general formula (I) and the general formula (II), and the photopolymerization initiator, and the optically active polyester is isomerized (trans- to cis-form) by light to change the helical pitch of the liquid crystal. The photopolymerization initiator can promote polymerization of the polymerizable group by light. Therefore, it is preferred that the optically active polyester and the photopolymerization initiator have different photosensitivity wavelength ranges from each other about light rays from sources of light. "Have different photosensitivity wavelength ranges" means that the central photosensitive wavelengths of the two do not overlap with each other and the liquid crystal orientations of the two do not change mutually, when the liquid crystal composition is exposed imagewise or hardened by polymerization, in such a degree that does not cause a fall in display property of images and does not cause a fall in color purity or resolution by selective reflection. In order that the central photosensitive wavelengths do not overlap with each other, the molecular structures of the two may be selected or the wavelength of radiated light may be controlled through a band pass filter or the like.

By causing the two to be photosensitized with light rays having different wavelengths, it is possible to irradiate the liquid crystal composition imagewise with light, thereby orienting the liquid crystal molecules in a pattern, and subsequently fix the orientation without producing any effect on the helical pitch of the liquid crystal oriented into the pattern, thereby yielding an image whose helical pitch is a desired pitch. For example, in the case that the liquid crystal phase is a cholesteric liquid crystal phase, it is possible to obtain a color phase exhibiting a selective reflected color based on a desired helical pitch and having excellent color purity and resolution.

Polymerizable Monomer

The liquid crystal composition of the present invention may contain a polymerizable monomer in order to improve, for example, the hardness degree or the strength of a film to be produced. When the polymerizable monomer is used together, it is possible to change (pattern) the twisting power of the liquid crystal by irradiation with light (for example, form a distribution in selective reflected wavelength) and subsequently fix the helical structure (selective reflectivity), thereby improving the strength of the liquid crystal composition after the fixation. However, when the liquid crystal compound has a polymerizable group in its molecule, the polymerizable monomer may or may not be added.

The polymerizable monomer may be, for example, a monomer having an ethylenic unsaturated bond, and is specifically polyfunctional monomers such as pentaerythritol tetraacrylate or dipentaerythritol hexaacrylate.

Specific examples of the monomer having an ethylenic unsaturated bond are the following compounds. In the present invention, however, the monomer is not limited thereto.

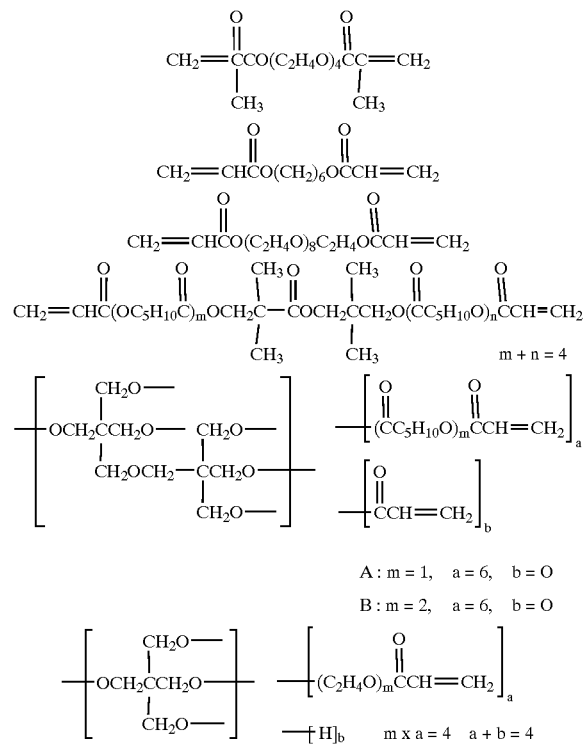

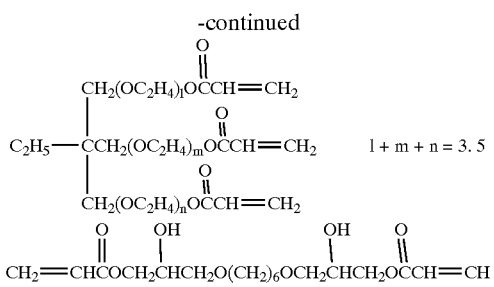

The added amount of the polymerizable monomer is preferably from 0.5 to 50% by mass of the whole solid content of the liquid crystal composition. If the added amount is less than 0.5% by mass, the composition may not be sufficiently hardened. If the added amount is more than 50% by mass, the orientation of the liquid crystal molecules may be inhibited and sufficient color-development may not be obtained.

Other Components

As other components, the following may be added to the liquid crystal composition: a binder resin, a solvent, a surfactant, a polymerization inhibitor, a thickener, a colorant, a pigment, an ultraviolet absorbent, a gelation agent and so on.

Examples of the binder resin include polystyrene compounds such as polystyrene and poly-α-methylstyrene; cellulose resins such as methylcellulose, ethylcellulose and acetylcellulose; acidic cellulose derivatives having a carboxylic group in its side chain; acetal resins such as polyvinylformal and polyvinylbutyral; and methacrylic acid copolymer, acrylic acid copolymer, itaconic acid copolymer, crotonic acid copolymer, maleic acid copolymer and partially-esterized maleic acid copolymer described in JP-A No. 59-44615, Japanese Patent Application Publication (JP-B) Nos. 54-34327, 58-12577 and 54-25957 and JP-A Nos. 59-53836 and 59-71048.

The binder resin may be homopolymer of an acrylic acid alkyl ester or homopolymer of methacrylic acid alkyl ester. The alkyl may be a methyl, ethyl, n-propyl, n-butyl, isobutyl, n-hexyl, cyclohexyl, 2-ethylhexyl or the like group.

Besides, the binder resin may be a product wherein an acid anhydride is added to polymer having a hydroxyl group, benzyl(meth)acrylate/(homopolymer of methacrylic acid) acrylic acid copolymer, a terpolymer of benzyl(meth)acrylate/(meth)acrylic acid/another monomer, or the like.

The content of the binder resin in the liquid crystal composition is preferably from 0 to 50% by weight, and more preferably from 0 to 30% by weight. If the content is more than 50% by weight, the liquid crystal compound may be insufficiently oriented.

The liquid crystal composition of the present invention preferably contains a surfactant together with the photoreactive chiral agent and the liquid crystal compound. The surfactant is preferably a surfactant producing an excluded volume effect. "Producing an excluded volume effect" means that when a layer containing a liquid crystal composition is formed, for example, by coating, the spatial orientation state of the interface between the surface of the layer and the air is three-dimensionally controlled. Specifically, a nonionic surfactant is preferred, which can be appropriately selected from known nonionic surfactants.

The polymerization inhibitor may be added to improve the preservation performance of the liquid crystal composition. Examples thereof include hydroquinone, hydroquinone monomethyl ether, phenothiazine, benzoquinone and derivatives thereof. The added amount of the polymerization inhibitor is preferably from 0 to 10% and more preferably from 0 to 5% by weight of the polymerizable monomer.

The liquid crystal composition of the present invention can be prepared by dissolving or dispersing the above-mentioned respective components in a suitable solvent. This is formed in arbitrary, or formed on a support. The resultant can be used. Examples of the solvent include 2-butanone, cyclohexanone, methylene chloride and chloroform.

Method of Changing the Helical Structure of a Liquid Crystal

As described above, the liquid crystal composition of the present invention comprises the photoreactive chiral agent (the optically active polyester of the present invention), and in the method of changing the helical structure of a liquid crystal of the present invention, the liquid crystal composition of the present invention is irradiated, in a desired pattern, with light having a desired light quantity, thereby changing the helical pitch (twisting power) of the liquid crystal so as to make it possible to form areas which are different in the helical structure of the liquid crystal, that is, in the degree of the twist of the helix (helical twisting power: HTP).

Particularly in the case that the liquid crystal phase is made up to a cholesteric liquid crystal phase, the selective reflected color of the liquid crystal can be changed in arbitrary in accordance with its twisting power. When the rate of change of this twisting power (the rate of change in twisting) is high, the color range of selective reflected colors which can be selectively reflected on the liquid crystal is wide so that wide wavelength ranges including the wavelengths of three primary colors (B, G and R) can be selectively reflected. This matter is important in that particularly the three primary colors of B, G and R can be displayed with high color purity and good resolution. Thus, the above-mentioned optically active polyester of the present invention can change largely in the twisting power of the helical structure of the liquid crystal; therefore, by using the liquid crystal composition containing this polyester compound (chiral agent), various color phases including the three primary colors of B, G and R can be displayed and further the three primary colors are superior in color purity and resolution.

Specifically, the above-mentioned method can be performed as follows. When the liquid crystal composition is irradiated with light having a wavelength, the coexisting photoreactive chiral agent (the optically active polyester of the present invention) is photosensitized in accordance with the irradiation intensity of the light, so as to change the helical structure (twisting angle) of the liquid crystal. In this way, a pattern corresponding to an image is formed (patterning). In the case of a cholesteric liquid crystal composition, different selective reflected colors are exhibited by this structural change. Therefore, when desired areas are irradiated with light rays having irradiation intensities varied for the respective areas, the areas are oriented correspondingly to the irradiation intensities (exhibition of plural colors). For example, by exposing the areas to light through an exposure mask made in such a manner that its light transmittance is distributed imagewise, an image can be formed by the one-time irradiation with the light. For example, colored areas where different colors are selectively reflected can be simultaneously formed.

Moreover, according to the optically active polyester of the present invention, the helical pitch of the liquid crystal can be changed to a large extent. In the case of a cholesteric liquid crystal composition, the formed colored areas exhibit various selective reflected colors and the three primary colors of B, G and R can be formed with excellent color purity and resolution. The above-mentioned irradiation with the light may be performed, without any restriction, by any method making it possible to change the irradiation intensity for each of the areas, as well as the method of using the exposure mask.

In the case of forming a liquid crystal color filter, an optical film or the like, which is described above, the liquid crystal composition is exposed imagewise to light having a wavelength as described above to pattern the composition and subsequently the patterned composition is further irradiated with light to photopolymerize and harden polymerizable groups in the composition. In this way, the helical structure of the liquid crystal is fixed into a desired selective reflected color. These methods will be detailed as a "method of fixing the helical structure of a liquid crystal" later.

A source of light used for the irradiation with light is a source of light emitting ultraviolet rays since it gives a high energy and makes it possible to attain the change of the structure of the liquid crystal compound and polymerization reaction promptly. The source of light is, for example, a high-pressure mercury lamp, a metal halide lamp, a Hg—Xe lamp or the like. The source of light has preferably a function for varying light quantity.

As described above, when the liquid crystal composition comprises, as a chiral agent, the optically active polyester having at least constituent units represented by the general formula (I) and the general formula (II), the helical pitch (twisting power) can be largely changed for light quantity. Therefore, in the case of a cholesteric liquid crystal phase using a nematic liquid crystal compound as a liquid crystal compound, the range of selective reflected colors which the liquid crystal can exhibit is made wide and three primary colors of blue (B), green (G) and red (R) having superior color purity and resolution can be obtained.

As described above, when the optically active polyester having at least constituent units represented by the general formula (I) and the general formula (II) is used, the rate of change of the helical pitch, which results from the present compound and is induced in the liquid crystal with irradiation with light, is high. Using this fact, it is possible to form a liquid crystal color filter, or optical films such as a circularly polarized light separating film, glasses for stereoscopic vision, or a polarized light mask. The present polyester can be applied to a wide-band switchable mirror, a recording medium of written by light, or the like. By doping a ferroelectric liquid crystal, an antiferroelectric liquid crystal or a TGB phase with the present polyester, the polarization state thereof or the helical pitch can be patterned. Naturally, the present polyester can be used as an ordinary optically active polyester. The present polyester may also be applied to a helical structure inducing agent in an STN element or TN element.

The liquid crystal composition of the present invention may be blended with a non-chiral azo or styrene type compound which can be isomerized by light. The rate of change of the helical pitch can be more increased at the time of irradiation with light.

Method of Fixing the Helical Structure of a Liquid Crystal

As described above, by irradiating the optically active polyester (photoreactive chiral agent) having at least constituent units represented by the general formula (I) and the general formula (II) with light having a specific wavelength, the twisting power of the coexisting liquid crystal and the helical structure thereof can be changed. According to one aspect of the liquid crystal composition of the present invention, the composition comprises a liquid crystal compound having a polymerizable group, a photopolymerization initiator, and at least one selected from the optically active polyesters having at least constituent units represented by the general formula (I) and the general formula (II). In the method of fixing the helical structure of a liquid crystal of the present invention, the changed helical structure can be fixed and the strength of the liquid crystal composition after the fixation can be improved by polymerizing the liquid crystal compound. It is preferred to use, as the photopolymerization initiator and the optically active polyester, those having different photosensitivity wavelength ranges each other.

Specifically, the method can be performed as follows. First, the liquid crystal composition is irradiated imagewise with light having a wavelength within the range of the photosensitive wavelength of the optically active polyester in the composition in the same way as in the patterning described in the item "Method of changing the helical structure of a liquid crystal". By the irradiation with the light, the optically active polyester is photosensitized to change the helical structure of the liquid crystal and form a pattern corresponding to an image (patterning). After the patterning, the liquid crystal composition is irradiated imagewise with light having a wavelength within the range of the photosensitive wavelength of the photopolymerization initiator in the composition. As a result, by means of the photopolymerization initiator, the liquid crystal compound is polymerized. Thus, the helical structure in the state after the change is fixed. Before this step, for example, the step of substitution with nitrogen may be set up.

In the case that the range of the photosensitive wavelength of the optically active polyester is different from that of the photopolymerization initiator, the irradiation with light for changing the HTP and the irradiation with light for photopolymerization do not influence on each other. Therefore, when the liquid crystal composition is exposed imagewise to change the HTP, photopolymerization does not progress. Therefore, patterning having a rate of changing HTP as is set can be attained. On the other hand, when the liquid crystal composition is photopolymerized to fix the helical structure, the optically active polyester does not react with the light and the pattern of changing HTP can surely be fixed.

In the case of forming a liquid crystal color filter or an optical film which will be described later, the liquid crystal composition is exposed imagewise as described above to light having a wavelength for photosensitizing the optically active polyester so as to pattern the component and subsequently the liquid crystal composition is exposed to light having a wavelength with which the photopolymerization initiator is photosensitized so as to photopolymerize the polymerizable group in the liquid crystal composition. In this way, the helical structure of the liquid crystal is fixed so as to exhibit a desired selective reflected color. These forming methods will be detailed later.

A source of light used for the irradiation with light is the same as exemplified in the description in the above-mentioned item "Method of changing the helical structure of a liquid crystal".

The following will describe a liquid crystal color filter, an optical film, and a recording medium.

Liquid Crystal Color Filter

The liquid crystal color filter of the present invention comprises a liquid crystal and at least one selected from the optically active polyesters of the present invention, and the liquid crystal compound is most preferably a nematic liquid crystal compound. If necessary, the color filter may comprise a polymerizable monomer, a photopolymerization initiator and at least one selected from the other components listed up about the descriptions on the liquid crystal composition of the present invention. Moreover, the color filter may comprise the above-mentioned surfactant having an excluded volume effect.

The color filter may be produced, for example, by irradiating the liquid crystal composition of the present invention, in a desired pattern, with light having a desired light quantity on the basis of the above-mentioned "method of changing the helical structure of a liquid crystal" and "method of fixing the helical structure of a liquid crystal".

The liquid crystal color filter of the present invention will be detailed by way of description on the method of producing the liquid crystal color filter.

The liquid crystal color filter of the present invention can be produced by selecting an appropriate composition from the liquid crystal composition of the present invention and known compositions comprising the optically active polyester having at least constituent units represented by the general formula (I) and the general formula (II).

In this case, the color filter may be in a sheet form made only of the above-mentioned liquid crystal composition, a form in which a layer containing the liquid crystal composition (liquid crystal layer) is formed on a desired support or a temporary support, or a form in which a different layer (film) such as an oriented film or a protective film is fitted to the above-mentioned form. In the latter two cases, the liquid crystal layer can be made up to a lamination made of a bi- or multi-layered structure. In this case, the above-mentioned exposure step may be performed plural times.

The nematic liquid crystal compound, the polymerizable monomer, the photopolymerization initiator and the other components may be the same as used in the liquid crystal composition of the present invention. The contents thereof and preferred ranges thereof are the same as in the case of the liquid crystal composition of the present invention. Preferably, the surfactant producing an excluded volume effect is used together.

The content of the optically active polyester having at least constituent units represented by the general formula (I) and the general formula (II), in the liquid crystal composition which constitutes the liquid crystal color filter, is also the same as in case of the liquid crystal composition of the present invention.

For example, the liquid crystal color filter of the present invention can be preferably made from the liquid crystal composition of the present invention.

The method of producing the liquid crystal color filter is not particularly limited. The method may be, for example, a production method comprising at least the step of exposing the composition imagewise to a first light ray and subsequently photopolymerizing and hardening the composition with a second light ray, which may be referred to as "the exposure step" hereinafter. That is, the "method of fixing the helical structure of a liquid crystal" of the present invention may be applied. Depending on a selected production aspect, the liquid crystal color filter may be formed through the step of orienting a surface contacting the liquid crystal composition appropriately (orienting step), the step of transferring/forming a liquid crystal layer by close-adhering and stripping (transferring step), the step of coating a cholesteric liquid crystal composition to form a liquid crystal layer (coating step), or the like step.

The following will describe, as an example of the production method including the exposure step, a specific aspect using a cholesteric liquid crystal composition.

Exposure Step

In the exposure step, both of the patterning of the liquid crystal compound and the fixing (polymerizing and hardening) thereof are performed by irradiation with light.

That is, the liquid crystal composition is exposed imagewise to a first light ray having a wavelength with which the optically active polyester, which may be referred to as "the photoreactive chiral agent" hereinafter, is highly photosensitized, so as to be patterned, and subsequently the composition is photopolymerized with a second light ray having a wavelength with which the polymerization initiator is highly photosensitized, so as to be hardened. In this way, the helical structure of the liquid crystal compound is fixed to exhibit a desired selective reflected color.

When the liquid crystal composition is irradiated with the first light ray, the coexisting photoreactive chiral agent is photosensitized in accordance with the illuminance thereof, so that the helical structure of the liquid crystal compound is changed. By this structural change, the liquid crystal compound exhibits different selective reflected colors to form a pattern corresponding to an image. Therefore, when the liquid crystal composition is irradiated with light rays having irradiation intensities different in its respective areas, plural colors are exhibited correspondingly to the irradiation intensities. For example, by exposing the liquid crystal composition to light rays through an exposure mask whose light transmittance is changed imagewise, an image can be formed by the one-time irradiation with the light. That is, colored areas exhibiting different selective reflected colors can be simultaneously formed. Furthermore, by hardening (fixing) the liquid crystal composition by irradiation with a second light ray, a liquid crystal color filter can be produced.

The wavelength of the first light ray is preferably set within a photosensitizing wavelength range of the photoreactive chiral agent, particularly to a wavelength close to a photosensitizing peak wavelength of the agent since sufficient pattern sensitivity can be obtained. The wavelength of the second light ray is preferably set within a photosensitizing wavelength range of the polymerization initiator, particularly to a wavelength close to a photosensitizing peak wavelength of the initiator since sufficient photopolymerization sensitivity can be obtained.

The illuminances (irradiation intensities) of the first and second light rays are not particularly limited, and can be appropriately selected to give light sensitivity at the time of the patterning and the polymerization/hardening, dependently on the ingredients to be used. The sources of light used for the irradiation with the first and second light rays may be the same as can be used in the irradiation of the above-mentioned liquid crystal composition with light.

More specifically, the method of producing the liquid crystal color filter may be a production method according to the following first or second aspect. The color filter can be more preferably produced by these two aspects.

First Aspect (1) Step of Forming the Liquid Crystal Composition in a Coating Solution Form on a Temporary Support to Form a Transferring Material having at Least a Liquid Crystal Layer The liquid crystal composition in a coating solution form can be prepared by dissolving or dispersing the above-mentioned respective components in a suitable solvent. Examples of the solvent include 2-butanone, cyclohexanone, methylene chloride and chloroform. In the production of the liquid crystal color filter, a cholesteric liquid crystal composition is preferred.

In the case that alien substances and so on are present on a product where the transferring material is to be transferred, a cushion layer comprising a thermoplastic resin and so on may be disposed between the liquid crystal layer and the temporary support in order to ensure adhesion at the time of transfer. It is also preferred to subject the surface of the cushion layer to an orienting treatment such as a rubbing treatment (orienting treatment step).

(2) Step of Laminating the Transferring Material on a Light-Transmissible Substrate It is allowable to use an image-receiving material having an image-receiving layer on a substrate, as well as the light-transmissible substrate. Without using any transferring material, the liquid crystal composition may be coated directly onto a substrate (coating step). The coating may be appropriately selected from known coating methods using a bar-coater, a spin-coater or the like. However, the method using the transferring material is preferred from the viewpoints of material-loss and costs.

(3) Step of Stripping the Transferring Material from the Light-Transmissible Substrate to Form a Cholesteric Liquid Crystal Layer on the Above-Mentioned Substrate (Transferring Step)

The liquid crystal layer may be composed of plural layers by further lamination after the following step (4).

(4) Exposure Step

The cholesteric liquid crystal layer is irradiated image-wise with ultraviolet rays having a luminance of $v^1$ through an exposure mask to form a pixel pattern exhibiting a selective reflected color, and the resultant is further irradiated with ultraviolet rays having a luminance of $v^2$ to harden the layer.

Second Aspect (1) Step of Disposing the Liquid Crystal Composition Directly on a Support which Constitutes a Color Filter to Form a Liquid Crystal Layer The liquid crystal layer can be formed by coating the liquid crystal composition prepared in a coating solution form in the same way as above by a known coating method using a bar-coater, a spin-coater or the like.

The same oriented film as above may be formed between the cholesteric liquid crystal layer and the temporary support. It is also preferred to subject the surface of the oriented layer to an orienting treatment such as a rubbing treatment (orienting treatment step).

(2) The Same Exposure Step as the Step (4) in the First Aspect

The thickness of the liquid crystal layer (sheet-form liquid crystal composition) which functions as a liquid crystal color filter is preferably from 1.5 to 4 μm.

Referring to FIGS. 1A to 1I, which are schematic views illustrating an aspect of the method of producing the liquid crystal color filter of the present invention, the aspect will be described.

First, the above-mentioned respective components are dissolved in a suitable solvent to prepare a cholesteric liquid crystal composition in a coating solution form. Details of the respective components and the solvent have been described above.

Figure 1B:
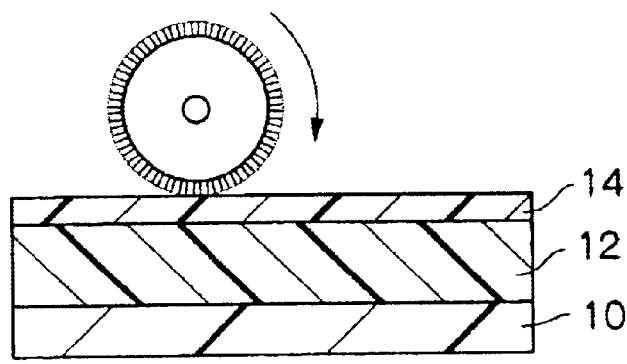

As illustrated in FIG. 1A, a support 10, which may be referred to as a "temporary support" hereinafter, is prepared. For example, acrylic resin, polyester, polyurethane or the like is applied onto the support 10 to dispose a cushion layer (thermoplastic resin layer) 12. Furthermore, an oriented film 14 comprising polyvinyl alcohol or the like is laminated thereon. As illustrated in FIG. 1B, this oriented film is subjected to a rubbing treatment. This rubbing treatment may not be performed. However, the rubbing treatment can cause an improvement in orientation.

Figure 1C:
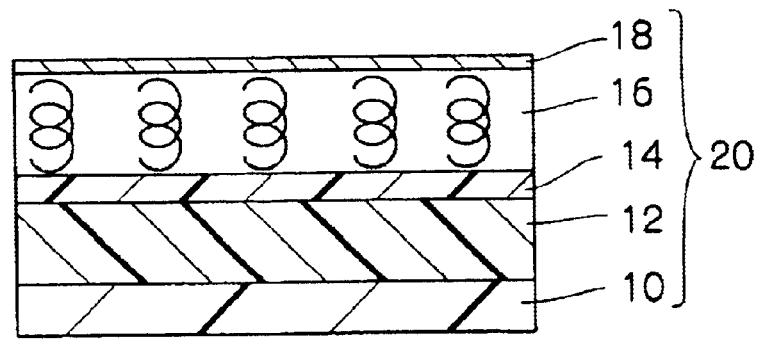

Next, as illustrated in FIG. 1C, a cholesteric liquid crystal composition in a coating solution form is coated onto the oriented film 14 and is dried to form a cholesteric liquid crystal layer 16. Thereafter, a cover film 18 is disposed on this cholesteric liquid crystal layer 16 to form a transferring material. This transferring material is referred to as the transferring sheet 20 hereinafter.

Figure 1D:
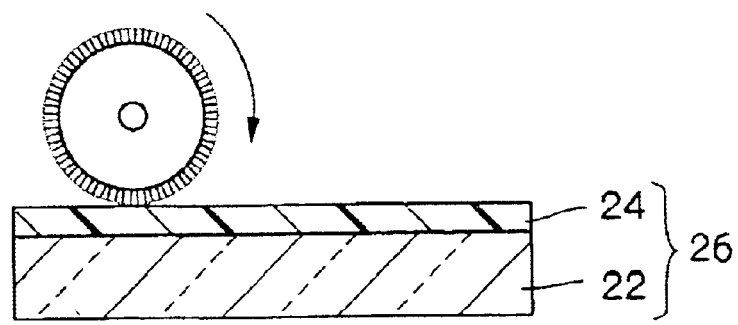

As illustrated in FIG. 1D, another support 22 is separately prepared. In the same way as above, an oriented film 24 is formed on the support. The surface thereof is subjected to a rubbing treatment. This is referred to as the color filter substrate 26 hereinafter.

Figure 1E:
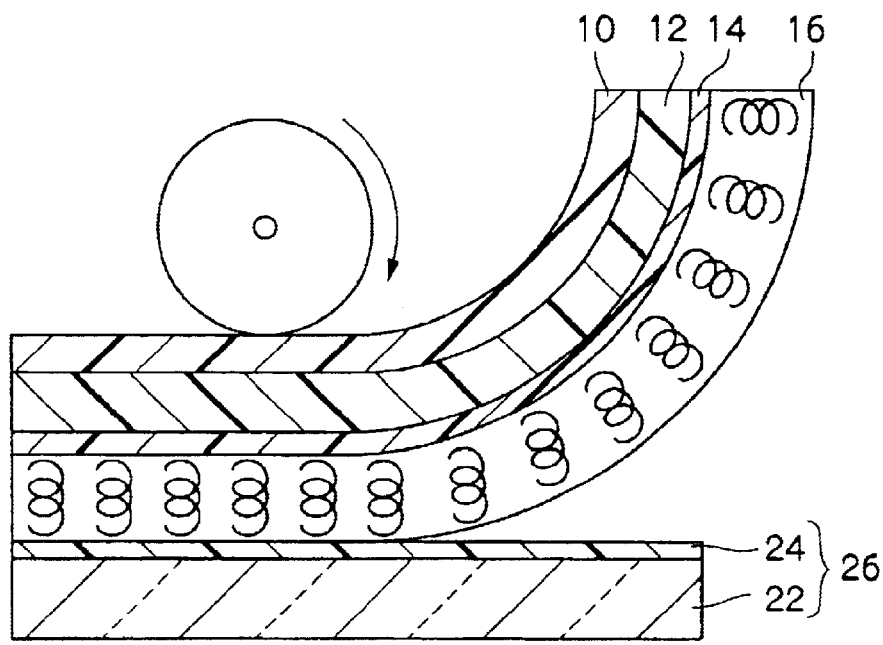
Figure 1F:
Figure 1F:
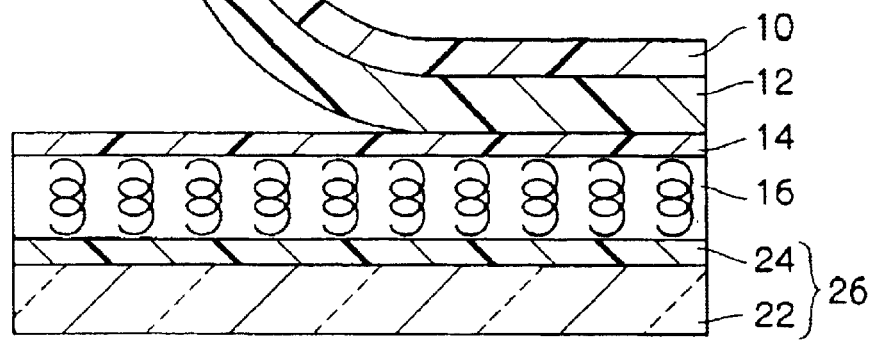

Next, the cover film 18 is stripped from the transferring sheet 20. Thereafter, the transferring sheet 20 and the color filter substrate 26 are stacked in such a manner that the surface of the cholesteric liquid crystal layer 16 contacts the surface of the oriented film 24, as illustrated in FIG. 1E, and then they are made into a lamination, using a roll rotating in the direction of an arrow in FIG. 1E. Subsequently, as illustrated in FIG. 1F, the oriented film 14 of the transferring sheet 20 is striped from the cushion layer 12 so that the cholesteric liquid crystal layer is transferred together with the oriented film 14 onto the color filter substrate 26. In this case, the cushion layer 12 may not necessarily be stripped together with the temporary support 10.

Figure 1G:
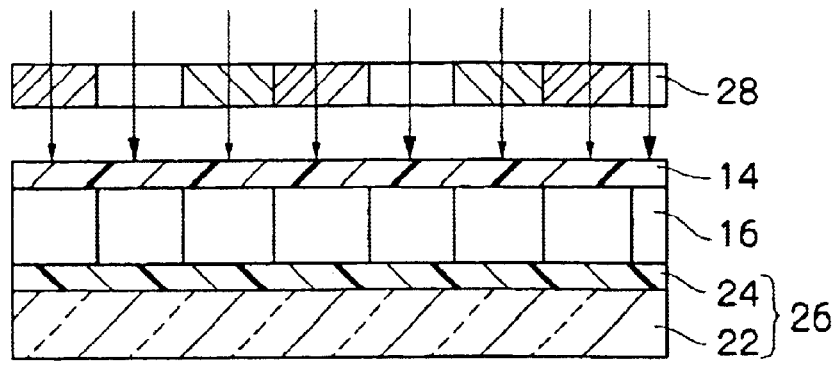

After the transfer, as illustrated in FIG. 1G, an exposure mask 28 having areas different in light transmittance is arranged above the oriented film 14. The cholesteric liquid crystal layer 16 is irradiated into a pattern form with a first light ray through this mask 28. The cholesteric liquid crystal layer 16 contains a liquid crystal compound, a chiral compound and so on, so as to produce different helical pitches in accordance with the irradiation quantity of the light. In the respective color patterns, structures having different helical pitches are produced, for example, in such a manner that the following areas are formed: areas where green color (G) is reflected and blue color (B) and red color (R) are transmitted, areas where blue color (B) is reflected and green (G) color and red (R) color are transmitted, and areas where red color (R) is reflected and green color (G) and blue color (B) are transmitted.

Figure 1H:
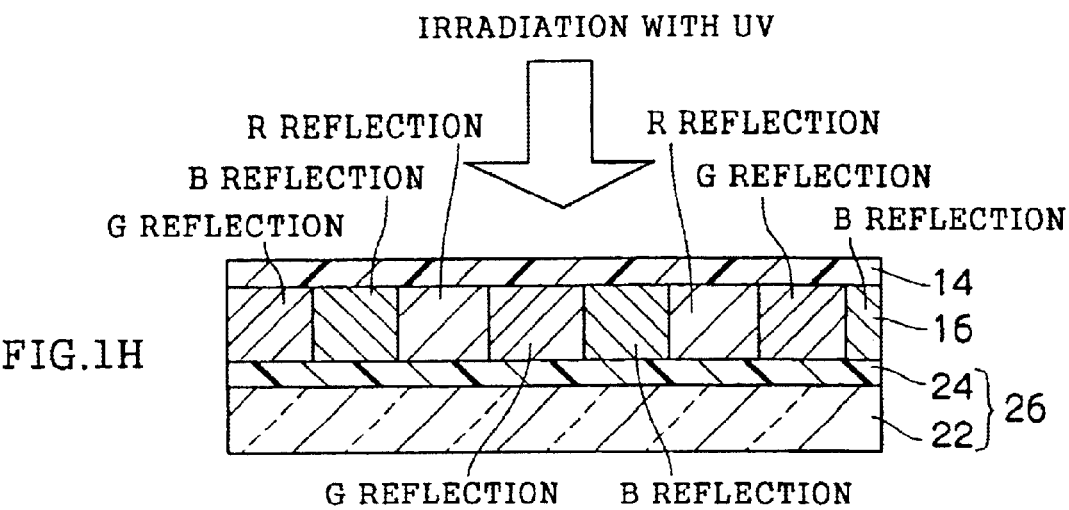

Next, as illustrated in FIG. 1H, the cholesteric liquid crystal layer 16 is irradiated with ultraviolet rays having an irradiation intensity different from that of the light rays in the above-mentioned step (G), so as to fix the pattern. Thereafter, 2-butanone, chloroform or the like is used to remove unnecessary portions (for example, remaining portions and non-exposed portions of the cushion layer, the middle layers and so on) on the cholesteric liquid crystal layer. In this way, a cholesteric liquid crystal layer having areas which B, G and R are reflected can be formed, as illustrated in FIG. 1I.

Figure 1I:
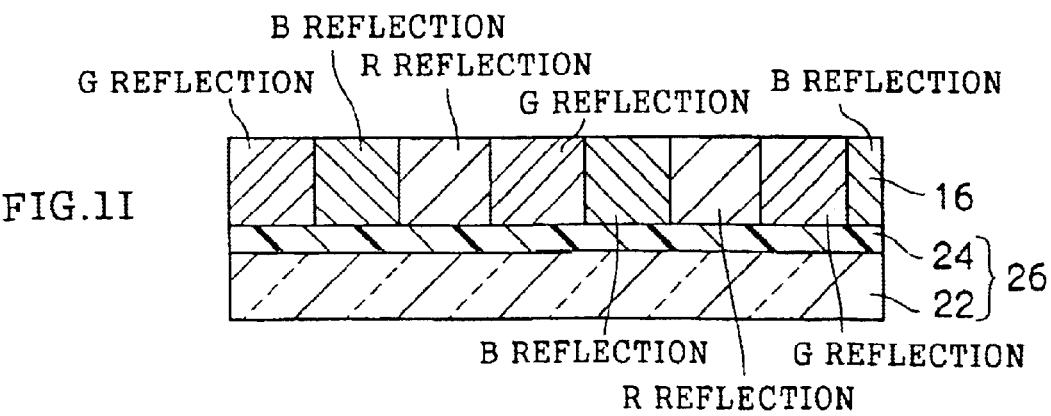

The method illustrated in FIGS. 1A to 1I is an aspect of the method of producing a color filter in a laminating manner. However, the color filter may be produced in a coating manner that a liquid crystal layer is applied directly onto the color filter substrate. If this manner is coated to the above-mentioned aspect, a cholesteric liquid crystal layer is applied onto the oriented film 24 of the color filter substrate 26 illustrated in FIG. 1D and then dried and subsequently the same steps as illustrated in FIGS. 1G to 1I are successively performed.

These steps, and ingredients of the used transferring material, support and so on are described in detail in Japanese Patent Applications No. 11-342896 and No. 11-343665 filed by the present Inventors.

As described above, when the liquid crystal composition containing the optically active polyester having at least constituent units represented by the general formula (I) and the general formula (II) is used, the rate of changing in the twisting power of the helical structure of the liquid crystal is high for light quantity. Therefore, the range of selective reflected colors which the liquid crystal can exhibit becomes wide, so that a liquid crystal color filter which is superior in color purity and resolution and has three primary colors of blue (B), green (G) and red (R) can be obtained.

Optical Film

The optical film of the present invention comprises a liquid crystal compound and at least one optically active polyester of the present invention, and makes it possible to set an arbitrary optical wavelength from wide wavelength ranges. If necessary, the optical filter may contain a polymerizable monomer, a photopolymerization initiator, and at least one selected from the other components listed up about the liquid crystal composition of the present invention, for example, the surfactant having an excluded volume effect. The color filter can be produced by irradiating the liquid crystal composition, in a desired pattern, with light having a desired light quantity. For example, the color filter can be produced on the basis of the "method of changing the helical structure of a liquid crystal" and the "method of firing the helical structure of a liquid crystal".

The optical film of the present invention can be produced by selecting an appropriate composition from the liquid crystal composition of the present invention and known compositions containing the optically active polyester having at least constituent units represented by the general formula (I) and the general formula (II). The form of the optical film is not particularly limited, and may be any one selected from a sheet form made only of the liquid crystal composition, a form in which a layer containing the liquid crystal composition (liquid crystal layer) is disposed on a desired support or temporary support, and the like forms. Furthermore, a different layer (film) such as an oriented film or a protective film may be formed.

The above-mentioned liquid crystal composition, polymerizable monomer, photopolymerization initiator and other components may be the same as can be used in the liquid crystal composition of the present invention. The contents thereof, and preferred ranges thereof are the same as in the case of the present liquid crystal composition. The content of the optically active polyester having at least constituent units represented by the general formula (I) and the general formula (II) in the liquid crystal composition which constitutes an optical film is also the same as in the above-mentioned liquid crystal composition of the present invention.

The optical film of the present invention can be suitably produced using, for example, the liquid crystal of the present invention.

The method of producing the optical film is substantially the same method of producing the liquid crystal color, and may be a method comprising at least the above-mentioned exposure step. That is, the above-mentioned "method of fixing the helical structure of a liquid crystal" may be used. Depending on a selected production aspect, the optical film may be produced through the above-mentioned orienting step, transferring step, coating step and so on.

More specifically, the color filter may be produced by substantially the same method as in the first aspect and the second aspect.

As described above, when the liquid crystal composition comprising the optically active polyester having at least constituent units represented by the general formula (I) and the general formula (II) is used, it is possible to obtain a non-light-absorbing type optical film capable of changing the helical pitch of the liquid crystal largely for light quantity. For example, in the case that the liquid crystal phase is a cholesteric liquid crystal phase, it is possible to obtain an optical film having a wide range of selective reflected colors of the liquid crystal and exhibiting various selective reflected colors, an optical film in primary colors (B, G and R) which is superior in color purity and resolution, and the like optical filter.

Recording Medium

The recording medium of the present invention comprises a liquid crystal compound and at least one optically active polyester of the present invention. If necessary, the recording medium may contain a polymerizable monomer, a photopolymerization initiator and at least one selected from the other components listed up about the liquid crystal composition of the present invention, for example, the surfactant having an excluded volume effect.

The form of the recording medium of the present invention is not particularly limited, and may be a sheet form made only of the liquid crystal composition, a form in which a layer containing a liquid crystal composition comprising the photoreactive chiral agent (liquid crystal layer) is disposed on a desired support or temporary support (referred to as the "support or the like" hereinafter). The liquid crystal composition herein may be appropriately selected from the liquid crystal composition of the present invention and known compositions containing the optically active polyester having at least constituent units represented by the general formula (I) and the general formula (II). Moreover, a different layer (film) such as an oriented film or a protective film may be disposed.

The liquid crystal compound, the polymerizable monomer, the photopolymerization initiator and the other components may be the same as can be used in the above-mentioned liquid crystal composition. The contents thereof and preferred ranges thereof are the same as in the case of the liquid crystal composition. The content of the optically active polyester having at least constituent units represented by the general formula (I) and the general formula (II) in the liquid crystal composition which constitutes the recording medium is also the same as in the liquid crystal composition of the present invention.

The recording medium of the present invention can be suitably produced, for example, by disposing the liquid crystal composition of the present invention on a support or the like.

Examples of the method of disposing the liquid crystal composition on the support or the like include a method (1) of using a transferring material wherein a liquid crystal layer containing the liquid crystal composition of the present invention is disposed on a temporary support to transfer the liquid crystal layer onto a support; and a method (2) of coating the liquid crystal composition prepared in a coating solution form directly onto a support.

According to the above-mentioned method (1) and (2), the transferring material, the manner of the coating, and so on are according to the description on the aspects (the first and second aspects) exemplified about the liquid crystal composition of the present invention, and the description on FIGS. 1A–1I.

The recording medium of the present invention, which is produced as described above, is irradiated in a desired pattern with light having a desired light quantity to make it possible to an image in accordance with the rate of changing in the twisting power of the liquid crystal. Particularly in the case of a cholesteric liquid crystal, it is possible to form colored images composed of selective reflected colors decided by the rate of change of the helical pitch. The formation of the images may be performed on the basis of the "method of changing the helical structure of a liquid crystal" and the "method of fixing the helical structure of a liquid crystal".

Moreover, when the optically active polyester having at least constituent units represented by the general formula (I) and general formula (II) is used as a chiral agent causing a change in liquid crystal structure, the rate of change in the twisting power of the helical structure of the liquid crystal is high for light quantity. It is therefore possible to form images having a wide color-reproducible range. Particularly in the case of a cholesteric liquid crystal, it is possible to widen the range of colors which are selectively reflected on the liquid crystal and multicolored images having high color purity and good resolution. The high rate of changing in the twisting power contributes largely to an improvement in sensitivity (speed) at the time of forming images.

Using, for example, a polymerizable liquid crystal compound or a polymerizable monomer, the liquid crystal after patterning can be fixed so that an image superior in image-stability can be formed.

A source of light for the irradiation with light may be the same as can be used for the liquid crystal composition of the present invention. In this case, optical recording can be appropriately performed. This is also true in the case of irradiation with light for fixing the liquid crystal.

As described above, by using, as a chiral agent which causes a change in the helical structure of liquid crystal molecules, the optically active polyester having at least constituent units represented by the general formula (I) and the general formula (II), it is possible to change the twisting power (twisting angle) of the liquid crystal largely. Particularly in the case of a cholesteric liquid crystal using a nematic liquid crystal compound, it is possible to widen the range of selective reflected wavelengths obtained by irradiation with light and, consequently, improve the color purity of three primary colors of B, G and R and resolution. Accordingly, the selectivity and vividness of color range of the liquid crystal are improved. Particularly in a liquid crystal color filter, an optical film and so on, clear and vivid color images can be displayed. In a recording medium, formed images can be varied into many color range.

EXAMPLES

The following will describe specific synthesis examples of the optically active polyester of the present invention. The present invention is not limited thereto. In the following examples, "part(s)" and "% " means "part(s) by mass" and "% by mass", respectively.

Example 1

Synthesis of a Polyester wherein the Molar Ratio (Charged-Component Ratio) of (1–8)/(A-1) was 4/5

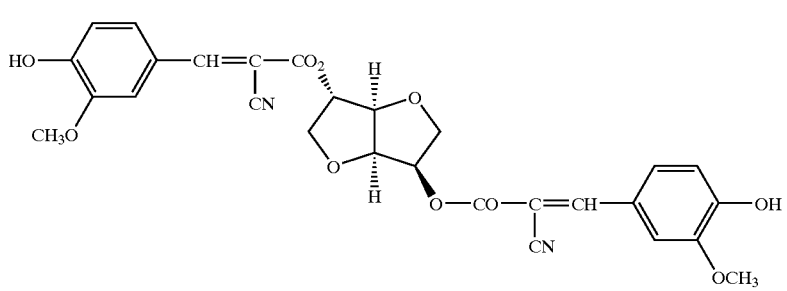

Compound C

The above-illustrated compound C (1 mmol) and terephthaloyl chloride (1.25 mmol) were mixed with N-methylpyrrolidone (5 mL), and the mixture was reacted at 80° C. for 10 hours. Methanol was added thereto, and the resultant solid was collected by filtration. The solid was washed with water to yield 0.42 g of light yellow powder (yield: 59%). The number-average molecular weight (Mn) of the resultant polymer was 2,400 in terms of polystyrene.

Example 2

Synthesis of a Polyester wherein the Molar Ratio (Charged-Component Ratio) of (1–8)/(A-1) was 4/5

The compound C (1 mmol) and terephthaloyl chloride (1.25 mmol) were mixed with THF (5 mL), and to the mixture was added dropwise triethylamine (2.2 mmol) under cooling with ice over 1 minute. The solution was stirred at room temperature for 1 hour. Thereto were added ethanol (5 ml) and triethylamine (0.8 mmol). The solution was stirred at room temperature for 30 minutes, and thereto were added ethanol and water. The resultant solid was collected by filtration. The solid was washed with water and methanol, to yield 0.66 g of light yellow powder (yield: 89%). The number-average molecular weight (Mn) of the component soluble in THF was 6,500 in terms of polystyrene.

Example 3

Synthesis of a Polyester wherein the Molar Ratio (Charged-Component Ratio) of (1–8)/(A-1) was 2/3

The same reaction as in Example 2 was conducted except that the amount of terephthaloyl chloride was changed from 1.25 mmol to 1.5 mmol and the amount of triethylamine was changed from 0.8 mmol to 1.4 mmol, so as to yield 0.75 g of a light yellow solid (yield: 85%). The number-average molecular weight (Mn) of the component soluble in THF was 4,200 in terms of polystyrene.

Example 4

Synthesis of a Polyester wherein the Molar Ratio (Charged-Component Ratio) of (1–8)/(A-1) was 3/2

The compound C (1.2 mmol) and terephthaloyl chloride (0.8 mmol) were mixed with THF (6 mL), and to the mixture was added dropwise triethylamine (2.6 mmol) under cooling with ice over 2 minutes. The solution was stirred at room temperature for 1 hour. Thereafter, thereto was added benzoyl chloride (0.9 mmol). The solution was stirred at room temperature for 1 hour, and thereto were added methanol and water. The resultant solid was collected by filtration. The solid was washed with water and methanol, to yield 0.75 g of light yellow powder (yield: 88%). The number-average molecular weight (Mn) of the component soluble in THF was 2,100 in terms of polystyrene.

Example 5
Synthesis of a Polyester wherein the Molar Ratio (Charged-Component Ratio) of (1–8)/(A-10) was 2/3

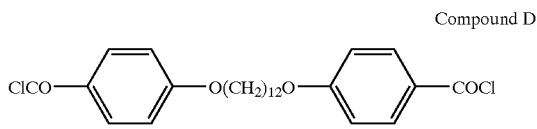
Compound D

To a mixture of the above-illustrated compound D (1.4 mmol), pyridine (2.8 mmol), triethylamine (2.8 mmol) and THF (10 mL) was added dropwise a solution (10 mL) of the compound D (2.1 mmol) in THF under cooling with ice for 30 minutes. The solution was stirred at room temperature for 1 hour. Thereafter, thereto were added triethylamine (1.4 mmol) and methanol (5 mL). Thereto was further added water, and then the insoluble substances were subjected to extraction with chloroform followed by column chromatography (silica gel, chloroform/methanol=20/1), to carry out purification. In this way, 1.4 g of light red powder was obtained (yield: 80%) The number-average molecular weight (Mn) of the powder was 4,200 in terms of polystyrene.

Example 6
Synthesis of a Polyester wherein the Molar Ratio (Charged-Component Ratio) of (1–8)/(A-14) was 2/3

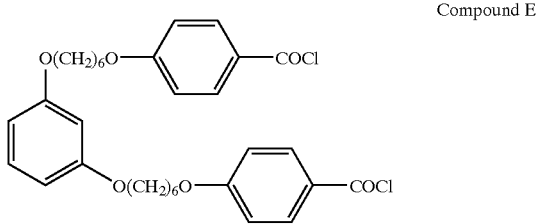
Compound E

The same reaction as in Example 2 was conducted except that terephthaloyl chloride (1.25 mmol) was changed to the compound E (1.5 mmol) and the amount of triethyleneamine was changed from 0.8 mmol to 1.4 mmol. The resultant solid was purified by recrystallization with THF/methanol, so as to yield 1.28 g of a light pink solid (yield: 100%). The number-average molecular weight (Mn) of the solid was 6,000 in terms of polystyrene.

Example 7
Synthesis of a Polyester wherein the Molar Ratio (Charged-Component Ratio) of (1–8)/(A-12) was 2/3

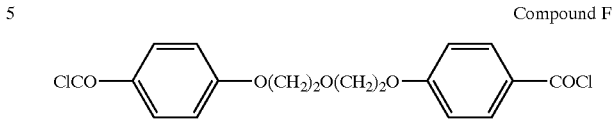
Compound F

The same reaction as in Example 2 was conducted except that terephthaloyl chloride (1.25 mmol) was changed to the compound F (1.5 mmol) and the amount of triethylamine was changed from 0.8 mmol to 1.4 mmol. The resultant solid was purified by recrystallization with DMAc (dimethylacetoamide)/ethanol, so as to yield 0.72 g of a light yellow solid (yield: 75%). The number-average molecular weight (Mn) of the component soluble in THF was 10,000 in terms of polystyrene.

Example 8
Synthesis of a Polyester wherein the Molar Ratio (Charged-Component Ratio) of (1–8)/(A-1)/(D-2) was 1/3/1

To a mixture of the above-illustrated compound C (0.5 mmol), terephthaloyl chloride (1.5 mmol), 2-methylhydroquinone (0.5 mmol) and THF (5 mL) was added dropwise triethylamine (2.2 mmol) under cooling with ice for 2 minutes. The solution was stirred at room temperature for 1 hour. Thereafter, thereto were added triethylamine (1.4 mmol) and ethanol (5 mL). The solution was stirred at room temperature. Thereto was further added water, and then the solid was collected by filtration and washed with water and methanol to yield 0.47 g of light yellow solid (yield: 81%).

The following will describe the use of the present invention by way of examples. The present invention is not limited to these examples. In the examples, "part(s)" and "%" means "part(s) by mass" and "% by mass", respectively.

Examples 9 to 15
Measurement of a Change in Helical Pitch by Irradiation with Light Each of the optically active polyesters (photoreactive chiral agents) obtained in Example 1 to 7 was mixed with the following nematic liquid crystal composition in the amount shown in Table 1 below, and then the mixture was poured into a wedge-shaped cell (glass thickness: 1.1 mm, a blue plate) subjected to monoaxially-orienting treatment with a polyimide oriented film. The helical pitch thereof was measured at room temperature with a polarized light microscope. This pitch was converted to helical twisting power (HTP). In this way, data on the initial HTP was obtained and is shown in Table 1.

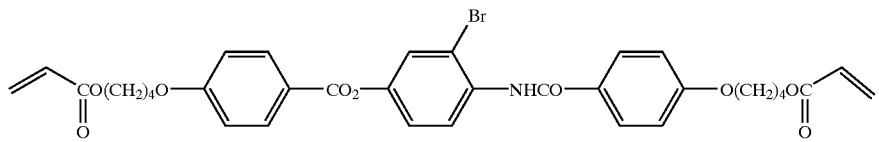

Next, the wedge-shaped cell was irradiated with ultraviolet rays from a high-pressure mercury lamp at an irradiation intensity of 300 mW/cm$^2$ for 3 minutes. After the irradiation, in the same way as above, the helical pitch was measured. This was converted to HTP. From the difference thereof from the initial value, the ratio of the HTP was calculated, and is shown Table 1.

As is evident from Table 1, the helical twisting power (HTP) of the helix was largely changed by the irradiation with ultraviolet rays. By a contact method, the directions of the twist before and after the irradiation with ultraviolet rays were checked. As a result, the directions of the twist before and after the irradiation were right directions.

onto a glass substrate with a spin coater, and then the substrate was dried in an oven of 100° C. temperature for 5 minutes. Thereafter, the substrate was carcined in the oven of 250° C. temperature for 1 hour to form an oriented film. Furthermore, the surface of the film was oriented by rubbing treatment to make a glass substrate with the oriented film.

(2) Formation of a Photosensitive Film

A coating solution for a photosensitive resin layer prepared according to the following formulation was coated onto the oriented film of the glass substrate with the oriented film, which was obtained in the above-mentioned step, with a spin coater. This was dried in the oven of 100° C. temperature for 2 minutes to form a photosensitive resin layer.

Coating Solution for the Photosensitive Resin Layer

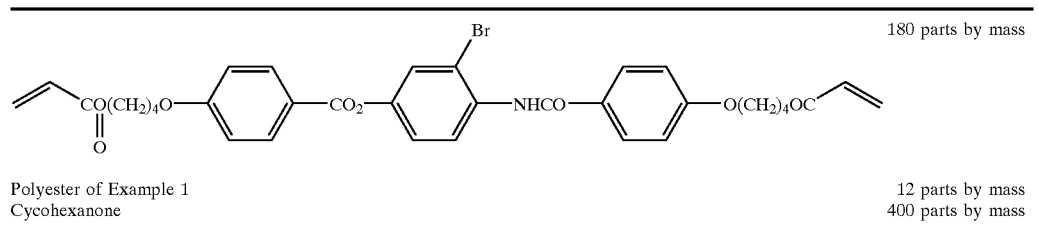

| | | 180 parts by mass |
|---|---|---|
| Polyester of Example 1 | | 12 parts by mass |
| Cycohexanone | | 400 parts by mass |

TABLE 1

| Compound No. | Amount | Initial HTP | HTP after irradiation | HTP ratio | Direction of the twist |
|---|---|---|---|---|---|
| Polyester of Example 1 | 5.7% | 64 | 10 | 6.4 | Right |
| Polyester of Example 2 | 5.7 | 72 | 12 | 6.0 | Right |
| Polyester of Example 3 | 5.7 | 74 | 12 | 6.2 | Right |
| Polyester of Example 4 | 5.6 | 47 | 9 | 5.2 | Right |
| Polyester of Example 5 | 5.7 | 43 | 9 | 4.8 | Right |
| Polyester of Example 6 | 5.8 | 24 | 7 | 3.4 | Right |
| Polyester of Example 7 | 5.7 | 15 | 6 | 2.5 | Right |

Examples 16 to 22 and Comparative Example 1
Measurement of Resolution
(1) Preparation of a Substrate A coating solution for a polyimide oriented film ("LX-1400" made by Hitachi Chemical Co., Ltd.) was applied Next, the glass substrate was held on a hot plate of 90° C. temperature for 5 minutes in such a manner that the surface of the glass substrate contacted the hot plate, so as to develop a color of the photosensitive resin layer. Furthermore, light was radiated on the photosensitive resin layer through a photo mask having openings of 80 μm size from a superhigh-pressure mercury lamp at 300 mW/cm$^2$ for 1 minute. After the light radiation, the substrate was kept at 90° C. for 3 minutes, and then the line width of the exposed portions was measured. As the line width is nearer 80 μm, the resolution of the resin layer is better.

Instead of the polyester of Example 1 in the above-mentioned photosensitive resin layer coating solution, each of the polyesters of Examples 2 to 7 and Comparative Example 1 was used to form a photosensitive resin layer, radiate light thereon and measure the line width of the exposed portion in the same way as above. These results are shown in Table 2.

Comparative Example 1

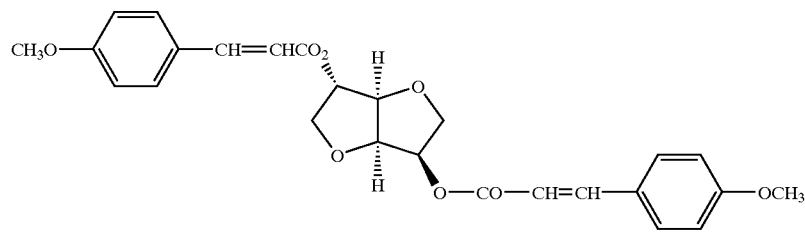

TABLE 2

| Compound No. | Line width (μm) |
| --- | --- |
| Polyester of Example 1 | 83 |
| Polyester of Example 2 | 81 |
| Polyester of Example 3 | 81 |
| Polyester of Example 4 | 83 |
| Polyester of Example 5 | 82 |
| Polyester of Example 6 | 81 |
| Polyester of Example 7 | 81 |
| Polyester of Comparative Example 1 | 150 |

It can be understood that cases using the optically active polyesters of Example 1 to 7 according to the present invention were superior in resolution.

Example 23

Production of a Wide-Band Circularly Polarized Light Reflecting Plate (1) Preparation of Substrate A coating solution for a polyimide oriented film ("LX-1400" made by Hitachi Chemical DuPont Co., Ltd.) was coated onto a glass substrate with a spin coater, and then the substrate was dried in an oven of 100° C. temperature for 5 minutes. Thereafter, the substrate was carcined in the oven of 250° C. temperature for 1 hour to form an oriented film. Furthermore, the surface of the film was oriented by rubbing treatment to make a glass substrate with the oriented film.

(2) Formation

A coating solution prepared according to the following formulation was applied onto the oriented film of the glass substrate with the oriented film, which was obtained in the above-mentioned step, with a bar coater. This was held on a hot plate of 110° C. temperature for 5 minutes, and then irradiated with light from a superhigh-pressure mercury lamp through a band pass filter having a central wavelength of 365 nm at 110° C. for 5 minutes.

Next, the substrate was kept at 110° C. in a dark place for 5 minutes. Thereafter, the band pass filter was removed. While nitrogen gas was blown against the substrate, the entire surface was irradiated with light from the same superhigh-pressure mercury lamp at an irradiation energy of 500 mJ/cm$^2$, so as to polymerize and harden the coat on the substrate. In this way, a circularly polarized light reflecting plate was produced.

[Formulation of the coating solution]

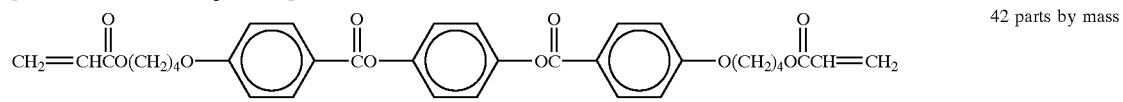

42 parts by mass

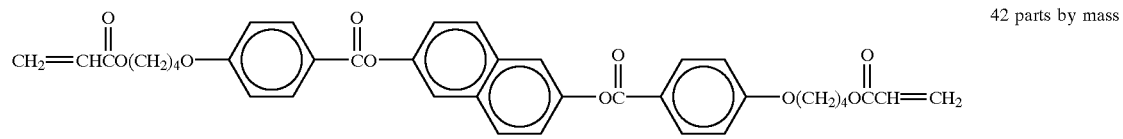

42 parts by mass

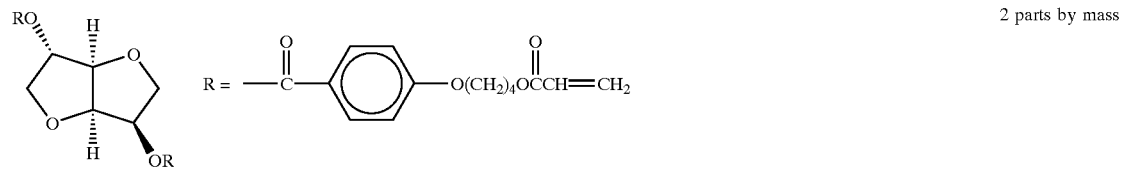

2 parts by mass

Polyester of Example 2      6 parts by mass

2 parts by mass

5 parts by mass

Chloroform      400 parts by mass

The thus-obtained circularly polarized light reflecting plate exhibited selective reflected colors having a wide wavelength range of 450 to 600 nm and had a sufficient band property as a wide-band circularly polarized light reflecting plate. Additionally, the right circularly polarized light reflectivity was 98% at a selective reflected wavelength of 550 nm.

Example 24

Production of a Liquid Crystal Color Filter (1) Preparation of a Filter Substrate A coating solution for a polyimide oriented film ("LX-1400" made by Hitachi Chemical Do Pont Co., Ltd.) was coated onto a glass substrate with a spin coater, and then the substrate was dried in an oven of 100° C. temperature for 5 minutes. Thereafter, the substrate was carcined in the oven of 250° C. temperature for 1 hour to form an oriented film. Furthermore, the surface of the film was oriented by rubbing treatment to make a glass substrate with the oriented film.

(2) Formation of a Filter Layer

A coating solution for a photosensitive resin layer prepared according to the following formulation was coated onto the oriented film of the glass substrate with the oriented film, which was obtained in the above-mentioned step, with a spin coater. This was dried in the oven of 110° C. temperature for 2 minutes to form a photosensitive resin layer.

[Formulation of the coating solution]

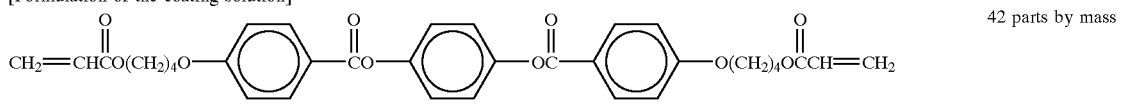 42 parts by mass

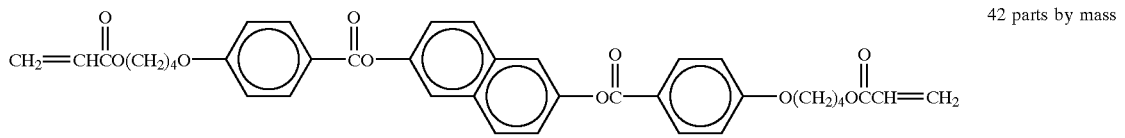 42 parts by mass

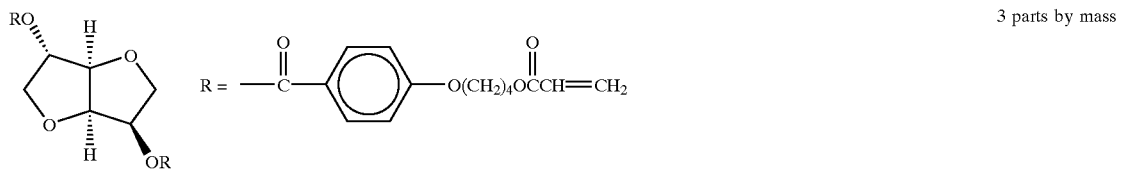 3 parts by mass

Polyester of Example 3 — 5 parts by mass

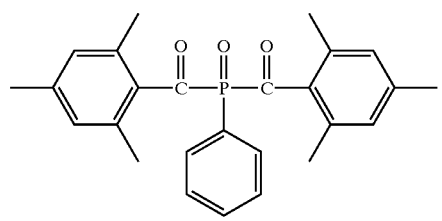 2 parts by mass

Dipentaerythritol hexaacrylate — 3 parts by mass
Chloroform — 400 parts by mass

Next, the glass substrate was held on a hot plate of 110° C. temperature for 5 minutes in such a manner that the surface of the glass substrate contacted the hot plate, so as to develop a color of the photosensitive resin layer. Furthermore, a superhigh-pressure mercury lamp was arranged through the following over the photosensitive resin layer: a photo mask having three transmittances (0%, 46% and 92%) and having areas arranged correspondingly to blue pixels, green pixels and red pixels, and a band pass filter having a central wavelength of 365 nm. The photosensitive resin layer was irradiated with light from the superhigh-pressure mercury lamp through the photo mask and the band pass filter, and was patterned. At this time, the irradiation energy for the red pixels was 300 mJ/cm$^2$, and the irradiation intensity was 30 mW/cm$^2$.

Next, the photo mask and the band pass filter were removed, and instead of it, a sharp cut filter transmitting light rays having a wavelength of 400 nm or more (transmittance at 400 nm: 50%) was fitted to the present system. While nitrogen gas was blown against the substrate, the entire surface was irradiated with light from the same superhigh-pressure mercury lamp at an irradiation energy of 500 mJ/cm$^2$, so as to polymerize and harden the resin layer on the substrate. In order to promote the hardness of the filter portion (photosensitive resin layer), the substrate was carcined in the oven of 220° C. temperature for 20 minutes to produce a color filter wherein red pixel, green pixel and blue pixel patterns were formed.

At the time of the patterning, the helical pitch of the liquid crystal (the twisting power of the liquid crystal) could be largely changed by the irradiation. A pixel pattern in red, green blue colors having high color purity could be formed.

Example 25
Production of an Optical Compensation Film for an STN Element

A polyethylene vinyl alcohol (PVA) film having a saponification degree of 99.5% was formed on triacetylcellulose (TAC) having a thickness of 80 μm by a bar coating method. This was heated below 110° C. for 3 minutes. The PVA film was subjected to rubbing treatment and then coated with a coating solution prepared according to the following formulation with a bar coater under heating. This was dried in an oven of 120° C. temperature for 3 minutes to form a film.

resultant was inserted between two polarized light plates whose absorption axes were perpendicular to each other. This exhibited good black according to observation with the naked eye. Accordingly, it was ascertained that the film (STM compensation film) produced in the above-mentioned steps acted as an optical compensation film for an STN element. This exhibited good black according to observation with the naked eye. Accordingly, it was ascertained that the film (STM compensation film) produced in the above-mentioned steps acted as an optical compensation film for an STN element.

Example 26
Prevention of the Generation of Reverse Twist Domains for a TN Element A coating solution for a polyimide oriented film ("LX-1400" made by Hitachi Chemical DuPont Co., Ltd.) was coated onto an ITO film of a glass substrate having the ITO film with a spin coater, and then the substrate was dried in an oven of 100° C. temperature for 5 minutes. Thereafter, the substrate was carcined in the oven of 250° C. temperature for 1 hour to form an oriented film. Furthermore, the surface

[Formulation of the coating solution]

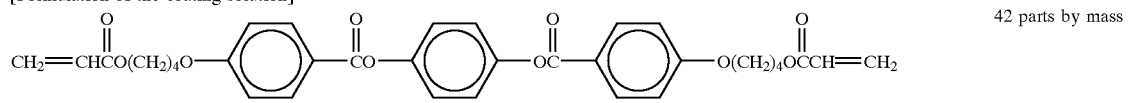

42 parts by mass

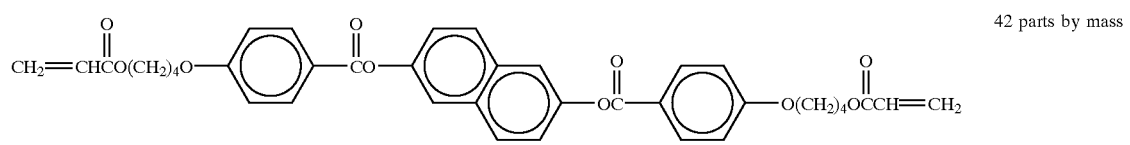

42 parts by mass

Polyester of Example 5

0.3 parts by mass 2 parts by mass

Chloroform 400 parts by mass

Next, a high-pressure mercury lamp set above the film was used to irradiate the film (irradiation energy: 1000 mJ/cm$^2$) at a temperature of 100° C. to polymerize and harden the film. In this way, an optical compensation film for an STN element, which is referred to as an "STN compensation film", was produced. The film thickness of the STN compensation film at this time was measured. The thickness was 5.0 μm. From a polarized light transmission spectrum profile of the STM compensation film, it was understood that the orientation (helical structure) of the liquid crystal molecules was twisted at 240 degrees toward the film thickness direction and the twisting angle (rotation angle) of the helix was 240 degrees.

An STM compensation film having a twisting angle (−240 degrees) reverse to the twisting angle of the above-mentioned film was prepared. These films were overlapped in such a manner that the liquid crystal molecules in their overlapped portions were perpendicular to each other. The of the film was oriented by rubbing treatment to make the rubbing angle thereof into 90 degrees. In this way, two glass substrates each having the oriented film were produced.

The glass substrates each having the oriented film were arranged so that the oriented films were opposite to each other. They were adhered with a two-liquid type epoxy resin adhesive agent with which spacer beads having a diameter of 6 μm were mixed to form a driving cell. The thickness of the cell was measured by a light interference method. It was 5.4 μm.

A product having following composition was poured into the cell.
Composition
  Nematic liquid crystal composition: 99.9% (ZLI-1132 made by Merck)
  Chiral agent of the present invention: 0.1% (polyester of Example 4)

Next, the driving cell subjected to the pouring was inserted between two polarized light plates whose absorption axes were perpendicular to each other. According to observation with the naked eye, no reverse twist domain was generated. Therefore, it can be expected that a drop in contrast based on the generation of reverse twist is not caused and images having superior contrast and color purity are displayed.

According to the present invention, it is possible to provide a new optically active compound which has photosensitivity and can be isomerized by light so as to be changed in structure.

According to the present invention, it is possible to provide a photoreactive chiral agent which can control the orientation of a liquid crystal compound and has a high rate of change of the helical pitch (twisting power) (the rate of change in twisting) of a liquid crystal by light. For example, in the case of a nematic liquid crystal compound, it is possible to provide a photoreactive chiral agent which can attain various selective reflections including reflections of three primary colors (B, G and R), and can display the three primary colors with high color purity and good resolution.

According to the present invention, it is possible to provide a liquid crystal composition containing a photoreactive chiral agent which can change the helical pitch (twisting power) of a liquid crystal by light and which has a high rate of change in twisting; and being capable of controlling the orientation state of liquid crystal molecules largely and three-dimensionally by light so as to change optical properties. For example, in the case of a cholesteric liquid crystal phase, it is possible to provide a liquid crystal composition which can exhibit various selective reflected colors including three primary colors (B, G and R) by irradiation with light, and can display the three primary colors with high color purity and good resolution.

According to the present invention, it is possible to provide a method of changing the helical structure of a liquid crystal, in which the helical pitch (twisting power) of the liquid crystal can be changed by irradiating a liquid crystal composition containing a photoreactive chiral agent having a high rate of change in twisting with light.

According to the present invention, it is possible to provide a method of fixing the helical structure of a liquid crystal, in which a liquid crystal composition containing a photoreactive chiral agent having a high rate of change in twisting is exposed imagewise to light and subsequently the helical structure can be fixed in the state that the patterned helical pitch is kept without being damaged. Particularly in the case that the phase of the liquid crystal is a cholesteric liquid crystal phase, it is possible to provide a method of fixing the helical structure of the liquid crystal, in which the helical structure of the liquid crystal is fixed into a desired selective reflected color so that a color tone having high color purity and good resolution can be obtained.

According to the present invention, it is possible to provide a liquid crystal color filter which contains a photoreactive chiral agent capable of changing the helical pitch (twisting power) of a liquid crystal largely by irradiation with light and which has high color purity and good resolution.

According to the present invention, it is possible to provide a non-light-absorbing type optical film containing a photoreactive chiral agent capable of changing the twisting power of a liquid crystal largely by irradiation with light. For example, in the case of a cholesteric liquid crystal phase, it is possible to provide an optical film having a wide selective reflection range, high color purity and good resolution.

According to the present invention, it is possible to provide a recording medium which contains a photoreactive chiral agent capable of changing the twisting power of a liquid crystal largely by irradiation with light and which is capable of forming a vivid image by changing light quantity imagewise. For example, in the case that the phase of the liquid crystal is a cholesteric liquid crystal phase, it is possible to provide a recording medium capable of forming an image made of selective reflected colors having wide range, high color purity and good resolution.

What is claimed is:

1. An optically active polyester comprising:
a constituent unit represented by the general formula (I):

General Formula (I)

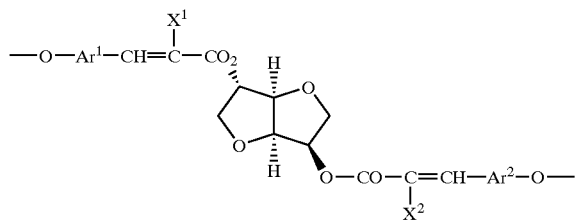

in which $Ar^1$ and $Ar^2$ each independently represents a bivalent aromatic group or a bivalent heteroaromatic group, and $X^1$ and $X^2$ each independently represents a hydrogen atom or an electron-withdrawing group; and
a constituent unit represented by the following general formula (II):

General Formula (II)

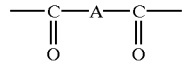

in which A represents a bivalent substituent.

2. An optically active polyester according to claim 1, wherein, in the general formula (I), the substituents represented by $Ar^1$ and $Ar^2$ are the same as one another, and the substituents represented by $X^1$ and $X^2$ are the same as one another and are each a hydrogen atom or a cyano group.

3. An optically active polyester according to claim 1, wherein, in the general formula (II), A represents a bivalent aromatic group.

4. An optically active polyester according to claim 1, further comprising a constituent unit represented by the following general formula (III):

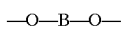     General Formula (III)

in which B represents a bivalent substituent.

5. An optically active polyester according to claim 1, wherein the constituent unit represented by the general formula (I) comprises a content thereof relative to all constituent components of from 10 to 90% by mol.

6. An optically active polyester according to claim 1, wherein the constituent unit represented by the general formula (I) comprises a diol component, the constituent unit represented by the general formula (II) comprises a dicarboxylic acid component, and a composition ratio of the diol component/the dicarboxylic acid component is in the range from 80/20 to 20/80.

7. An optically active polyester according to claim 1, wherein the optically active polyester comprises a polystyrene-equivalent number-average molecular weight of from 2,000 to 100,000.

8. A photoreactive chiral agent comprising an optically active polyester which includes:
a constituent unit represented by the following general formula (I):

General Formula (I)

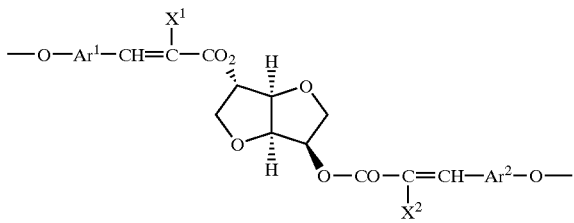

in which $Ar^1$ and $Ar^2$ each independently represents a bivalent aromatic group or a bivalent heteroaromatic group, and $X^1$ and $X^2$ each independently represents a hydrogen atom or an electron-withdrawing group; and
a constituent unit represented by the following general formula (II):

General Formula (II)

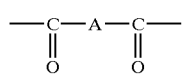

in which A represents a bivalent substituent.

9. A liquid crystal composition comprising a liquid crystal compound and at least one optically active polyester which includes:
a constituent unit represented by the following general formula (I):

General Formula (I)

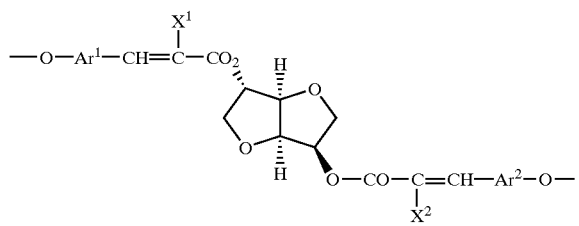

in which $Ar^1$ and $Ar^2$ each independently represents a bivalent aromatic group or a bivalent heteroaromatic group, and $X^1$ and $X^2$ each independently represents a hydrogen atom or an electron-withdrawing group; and
a constituent unit represented by the following general formula (II):

General Formula (II)

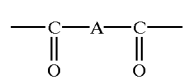

in which A represents a bivalent substituent.

10. A liquid crystal composition according to claim 9, wherein the liquid crystal compound is a nematic liquid crystal compound.

11. A liquid crystal composition according to claim 9, wherein the content of the optically active polyester in the liquid crystal composition is from 0.1 to 30% by mass.

12. A liquid crystal composition according to claim 9, wherein the liquid crystal compound has at least one polymerizable group, the composition further comprising a photopolymerization initiator.

13. A liquid crystal composition according to claim 12, which further comprises a polymerizable monomer.

14. A liquid crystal composition according to claim 12, wherein the optically active polyester and the photopolymerization initiator each comprises a photosensitivity wavelength range, and the photosensitivity wavelength ranges are substantially different from each other.

15. A method for changing a helical structure of a liquid crystal, the method comprising the steps of:
preparing a liquid crystal composition including a liquid crystal compound and at least one optically active polyester which includes
a constituent unit represented by the following general formula (I):

General Formula (I)

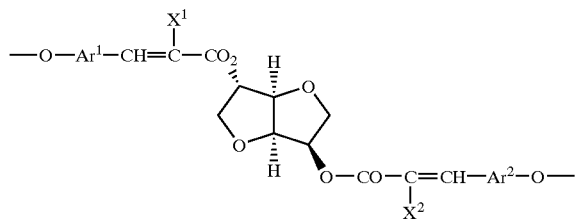

in which $Ar^1$ and $Ar^2$ each independently represents a bivalent aromatic group or a bivalent heteroaromatic group, and $X^1$ and $X^2$ each independently represents a hydrogen atom or an electron-withdrawing group, and
a constituent unit represented by the following general formula (II):

General Formula (II)

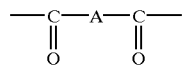

in which A represents a bivalent substituent; and
irradiating the liquid crystal composition with light for changing the structure of the optically active polyester.

16. A method for fixing a helical structure of a liquid crystal, the method comprising the steps of:
preparing a liquid crystal composition including a liquid crystal compound, a photopolymerization initiator and at least one optically active polyester which includes
a constituent unit represented by the following general formula (I):

General Formula (I)

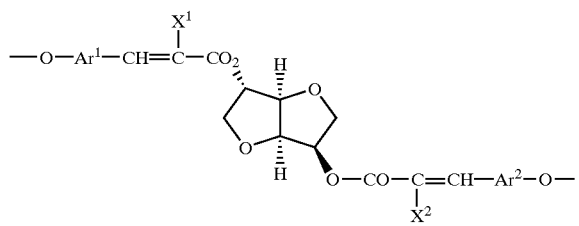

in which $Ar^1$ and $Ar^2$ each independently represents a bivalent aromatic group or a bivalent heteroaromatic group, and $X^1$ and $X^2$ each independently represents a hydrogen atom or an electron-withdrawing group, and a constituent unit represented by the following general formula (II):

General Formula (II)

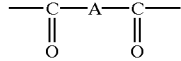

in which A represents a bivalent substituent;

irradiating the liquid crystal composition with light in a photosensitivity wavelength range of the optically active polyester; and then, irradiating the liquid crystal composition with light in a photosensitivity wavelength range of the photopolymerization initiator for carrying out photopolymerization.

17. A liquid crystal color filter comprising a liquid crystal compound and at least one optically active polyester which includes:

a constituent unit represented by the following general formula (I):

General Formula (I)

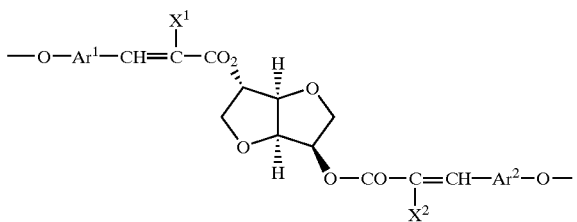

in which $Ar^1$ and $Ar^2$ each independently represents a bivalent aromatic group or a bivalent heteroaromatic group, and $X^1$ and $X^2$ each independently represents a hydrogen atom or an electron-withdrawing group; and a constituent unit represented by the following general formula (II):

General Formula (II)

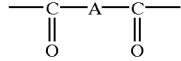

in which A represents a bivalent substituent.

18. An optical film comprising a liquid crystal compound and at least one optically active polyester which includes:

a constituent unit represented by the following general formula (I):

General Formula (I)

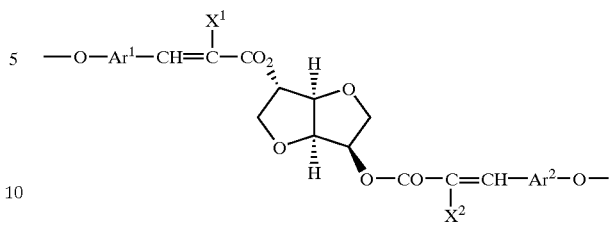

in which $Ar^1$ and $Ar^2$ each independently represents a bivalent aromatic group or a bivalent heteroaromatic group, and $X^1$ and $X^2$ each independently represents a hydrogen atom or an electron-withdrawing group; and a constituent unit represented by the following general formula (II):

General Formula (II)

in which A represents a bivalent substituent.

19. A recording medium comprising a liquid crystal compound and at least one optically active polyester which includes:

a constituent unit represented by the following general formula (I):

General Formula (I)

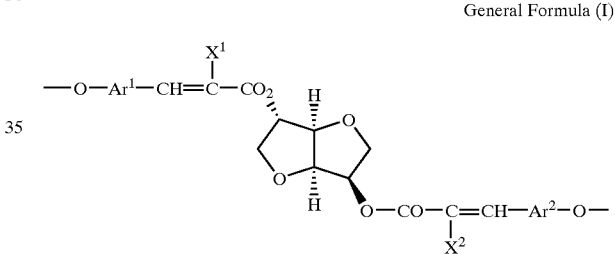

in which $Ar^1$ and $Ar^2$ each independently represents a bivalent aromatic group or a bivalent heteroaromatic group, and $X^1$ and $X^2$ each independently represents a hydrogen atom or an electron-withdrawing group; and a constituent unit represented by the following general formula (II):

General Formula (II)

in which A represents a bivalent substituent.

* * * * *